Nov. 10, 1959  H. BIDWELL  2,912,174
METHOD AND APPARATUS FOR THE TREATMENT OF PAPER STOCKS
Filed Sept. 30, 1950  11 Sheets-Sheet 6

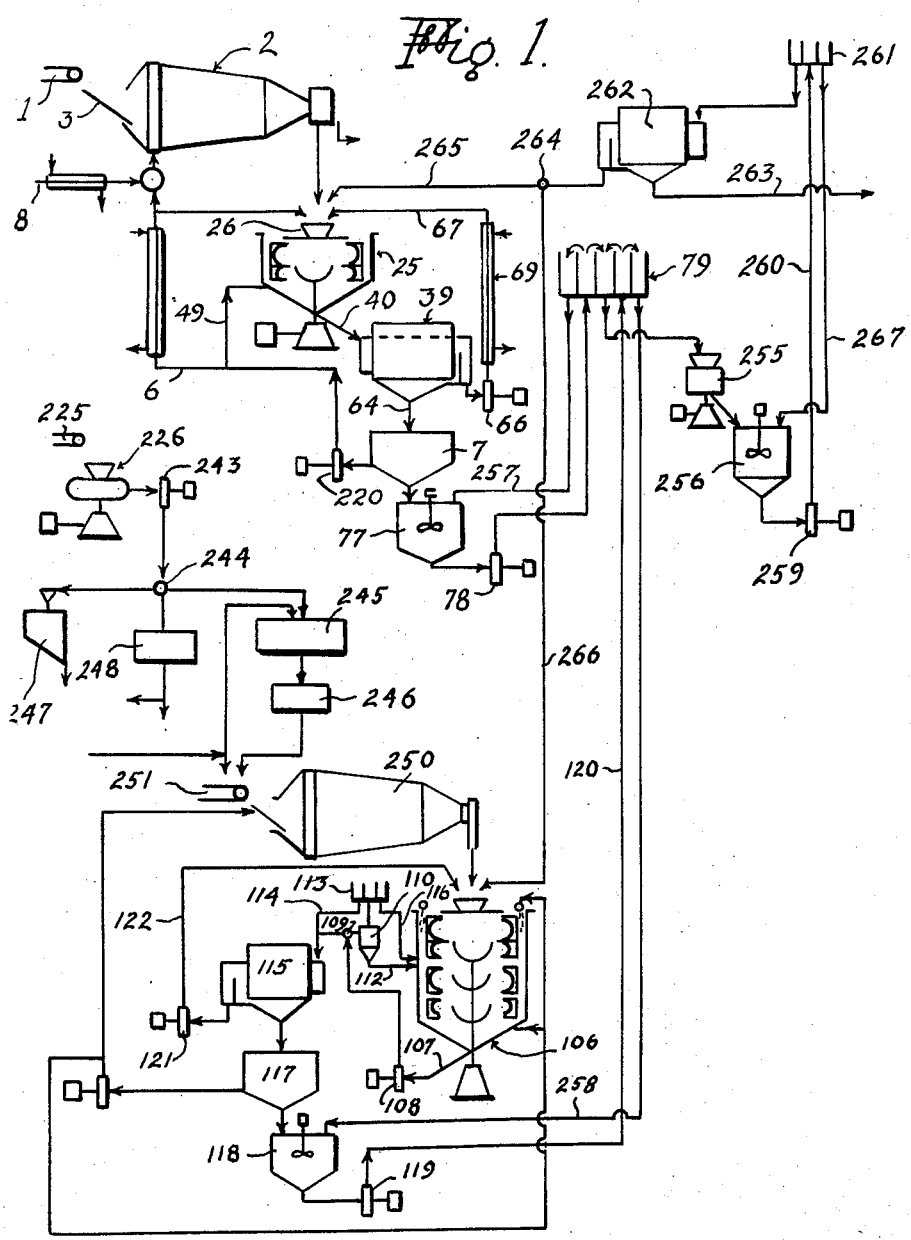

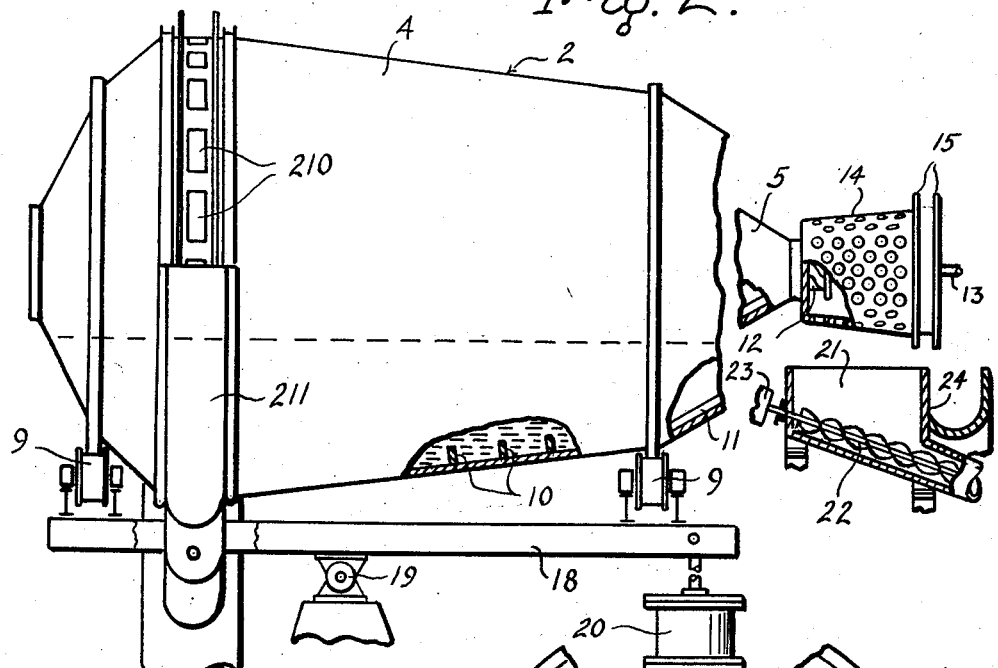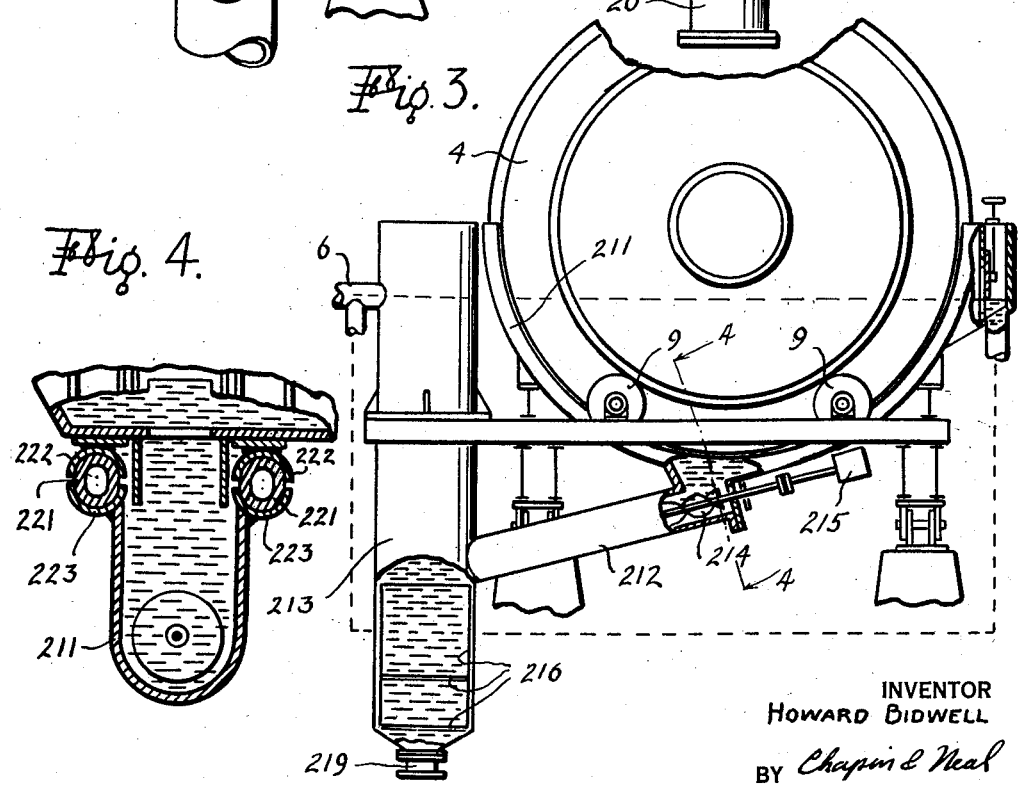

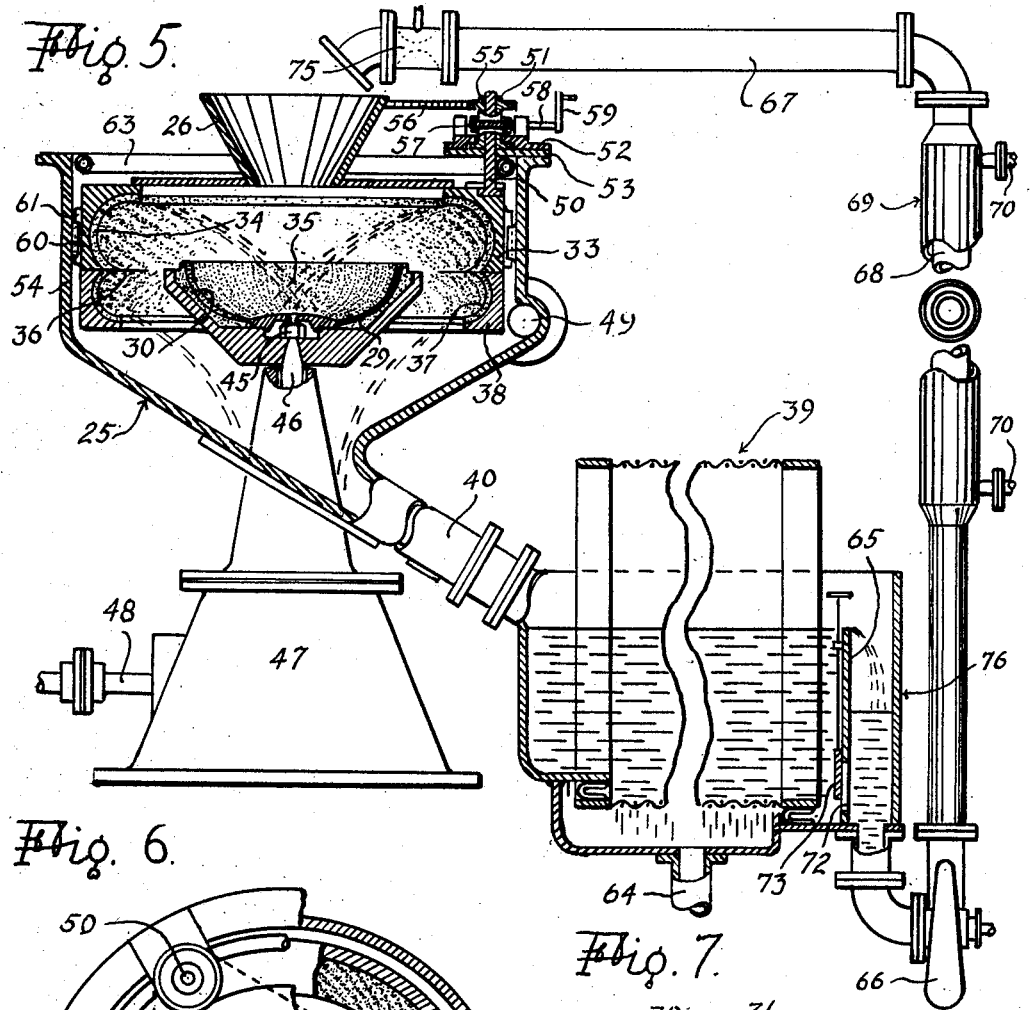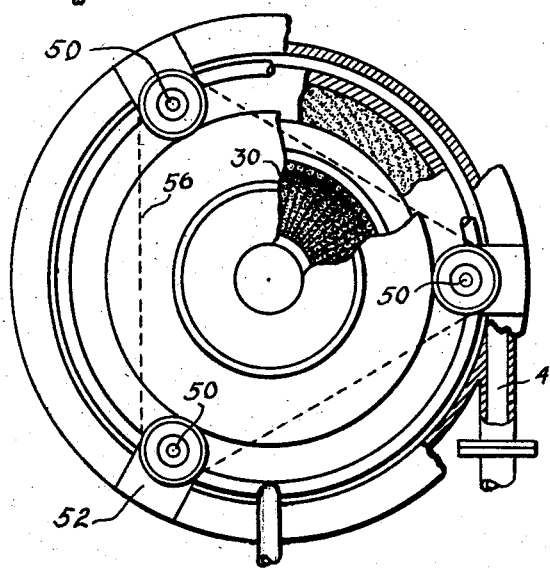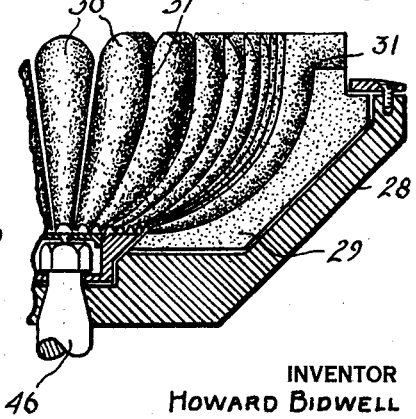

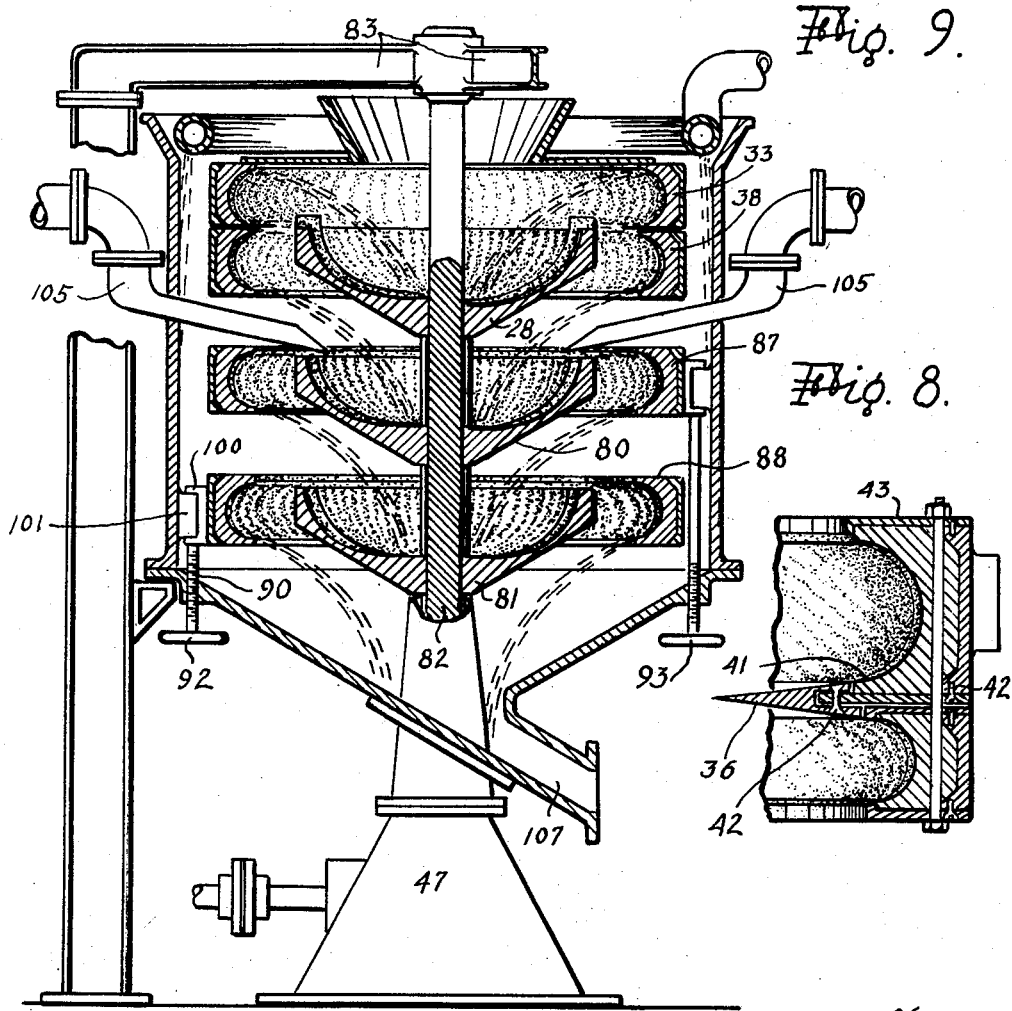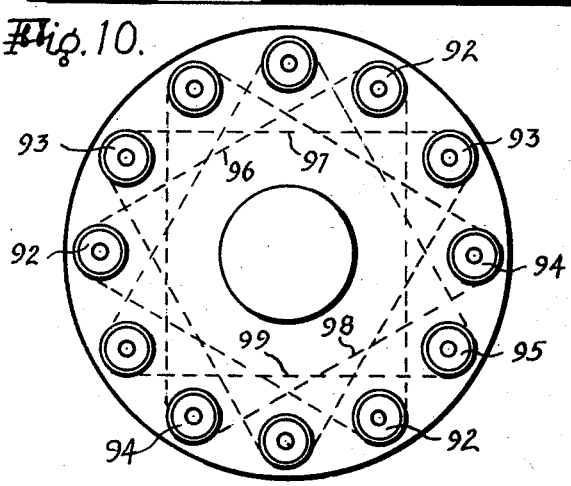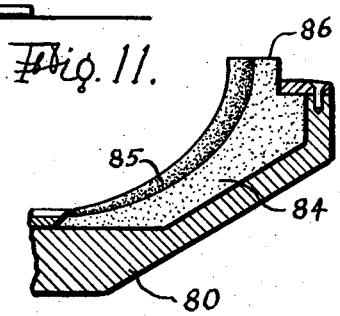

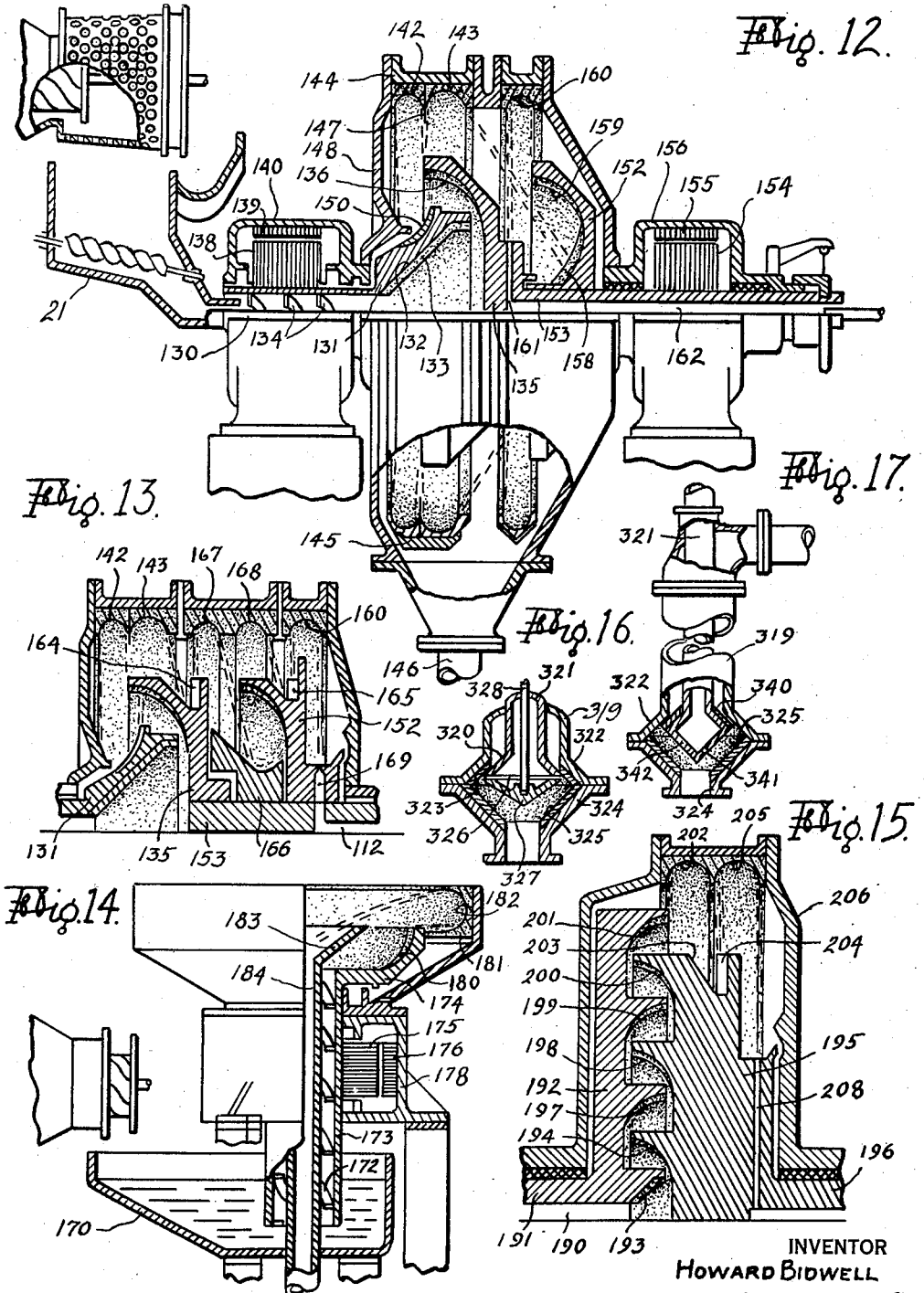

INVENTOR
HOWARD BIDWELL
BY Chapin & Neal
ATTORNEYS

Nov. 10, 1959     H. BIDWELL     2,912,174
METHOD AND APPARATUS FOR THE TREATMENT OF PAPER STOCKS
Filed Sept. 30, 1950     11 Sheets-Sheet 7

INVENTOR
HOWARD BIDWELL
BY Chapin & Neal
ATTORNEYS

Nov. 10, 1959     H. BIDWELL     2,912,174
METHOD AND APPARATUS FOR THE TREATMENT OF PAPER STOCKS
Filed Sept. 30, 1950     11 Sheets-Sheet 9

INVENTOR
HOWARD BIDWELL
BY Chapin & Neal
ATTORNEYS

INVENTOR
HOWARD BIDWELL
BY Chapin & Neal
ATTORNEYS

Nov. 10, 1959 H. BIDWELL 2,912,174
METHOD AND APPARATUS FOR THE TREATMENT OF PAPER STOCKS
Filed Sept. 30, 1950 11 Sheets-Sheet 11
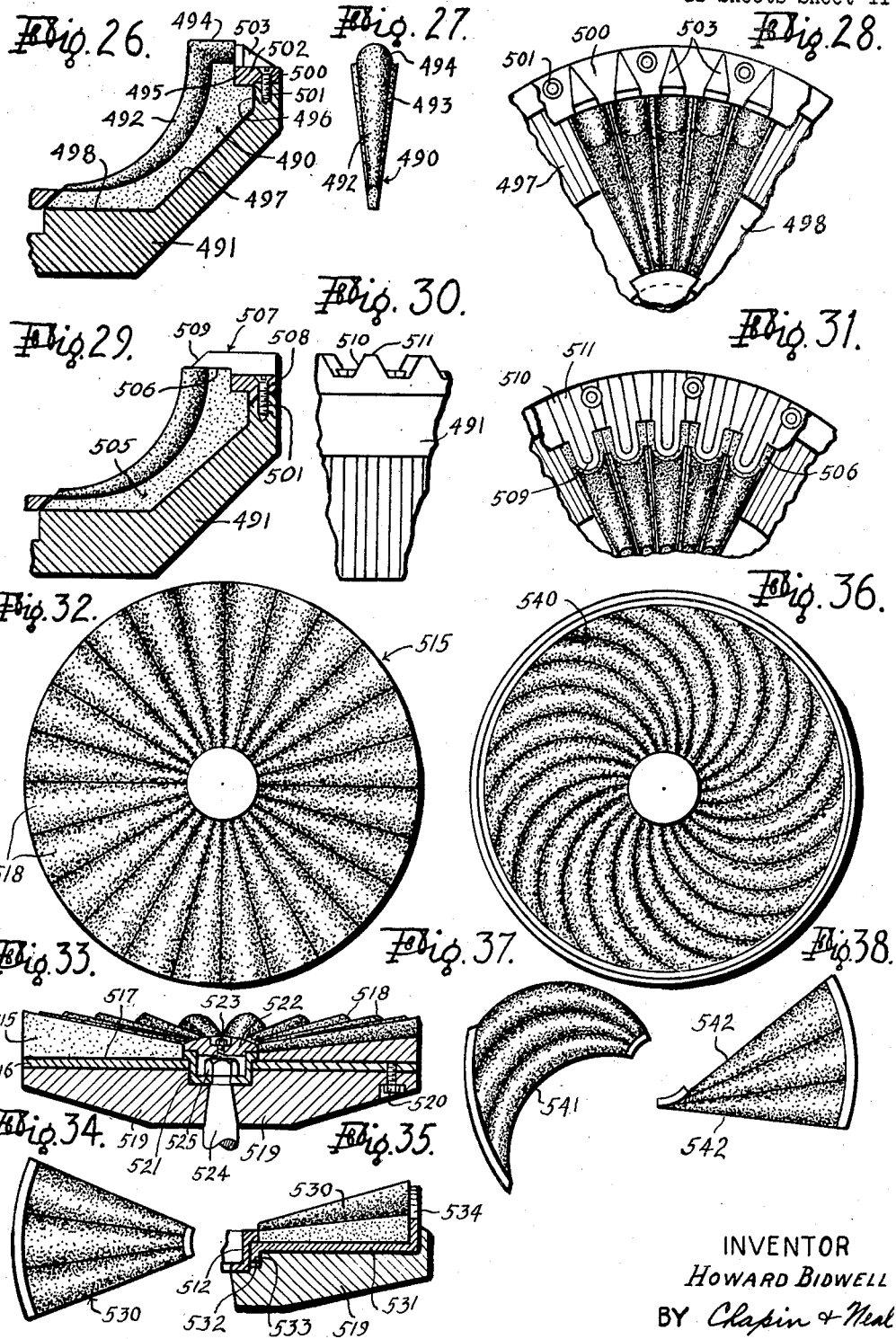
INVENTOR
HOWARD BIDWELL
BY Chapin & Neal
ATTORNEYS

United States Patent Office 2,912,174
Patented Nov. 10, 1959

2,912,174

METHOD AND APPARATUS FOR THE TREATMENT OF PAPER STOCKS

Howard Bidwell, Greenfield, Mass., assignor of one-half to Rachel Bidwell, Greenfield, Mass.

Application September 30, 1950, Serial No. 187,765

21 Claims. (Cl. 241—15)

This invention relates to improvements in apparatus for and methods of preparing fibrous stock for paper making. More particularly it relates to apparatus and methods directed to tempering, altering and changing the characteristics of the fibres of such stocks, preparatory to their processing, so that the fibres may be readily and rapidly separated in the processing, and further to the processing of the so-readied stock fibres by novel and advantageous methods and means by which the fibres are separated and fibrillated as desired for blending preparatory to desired reforming at the wet end of the paper making machine.

The processing of paper stock conventionally entails the use of large amounts of energy in the form of power applied to said stock for the purpose of separating the fibres as the stock is fed to beaters, pulpers and other conventional equipment. At this time the fibres are in an unfavorable physical condition for the application of power for processing, being in a dry state and possessing the maximum possible resistance to fibre separation, and further the conventional practices looking to the separation of the fibres tend to damage and weaken the fibres.

One general object of this invention is to overcome these conditions by the provision of means for altering the hygroscopic state of the fibres by pre-saturating the paper stock to a desired degree of penetration of wetness whereby the fibre characteristics are so tempered and changed that the fibre constituents no longer possess their normal rigidity, stiffness, grip, binding and holding power and are transformed from a state of maximum resistance to a state of minimum resistance to separation. By said moisture penetration the fibres, being hygroscopic, have had their absorptive powers and affinity for moisture sufficiently satisfied, short of objectionable hydration, as to be transformed to a swollen and limp state as to encourage separation due to the hygroscopic condition. In such condition the fibres more readily part and separate without destructive or other detrimental physical effects as to fibre length and strength, and by placing the stock in this condition prior to its introduction to the fibre separation process the present invention not only enormously reduces the power consumed in the separation process but materially improves the quality of the product.

Another general object is to provide ways and means of efficiently utilizing the forces characteristic of impact and shock to loosen and separate or promote the separation of the fibres of the stock. Within this general objective a further object is to provide novel means in which forces of the character indicated are utilized by imparting to the stock a high velocity and impinging the stock against a stationary or moving surface with either a complete or partial deceleration and/or with a subsequent change in its direction of movement. A further object within this general objective is to provide means by which the stock moving at high velocity is impinged against a stream of stock or water, moving at the same or a different velocity, in a manner to cause separation of the fibres by impact or turbulence. Also within this general purpose is the use of expansive forces created by the release of the stock from a higher to a lower hydrostatic pressure.

A further general object is to effect or promote separation of the fibres by subjecting the fibrous stock to a combing action by passing the stock over an abrasive or equivalent surface. Within this and the previously stated general objections it is an object to provide means by which high velocity is imparted to a flow of stock by directing it against a rapidly rotating abrasive surface across which it is driven by centrifugal force to impinge against a similar surface, stationary or rotating in the reverse, or the same direction, by which the fibre separating effects of shock and abrasive combing are successively or repetitiously imparted to the stock.

A further general object is to provide a method and means for specifically fibrillating the fibre constituents of the furnish material, with a minimum of cutting and damage to the fibres, which may be utilized in conjunction with and during the fibre separation processing or independently thereof. Within this general objective is the provision of ways and means of controlling the degree or extent to which the fibres are fibrillated as well as the speed at which a desired degree of fibrillation is attained, so that the characteristics of the fibres as to the extent of processing and fibrillation may be conformed to provide the tensile, and other strength and physical characteristics desired.

A further object is to provide means for subjecting a circulating flow of stock, hygroscopically conditioned to lower its resistance to fibre separation, to shock or combing or both, and constantly removing from such circulation that portion of the stock which has attained a predetermined degree of separation and/or fibrillation.

Other and further objects are the provision of means for stratifying and trimming out the more separated fibres from the less separated fibres; the provision of means of tempering the stock by the application of heat without dilution or contamination; the provision of novel means for removing sand, grit and junk from the paper stock, the provision of means for segregating and separating from waste paper such materials as cellophane, asphalt laminated or asphalt treated materials, and similar undesirable materials; and the provision of means for reducing fibrous stocks such as rags to a condition for saturation and fibre separation.

Still other and further objects and advantages residing in the details of construction and arrangements will be made apparent in the following disclosure.

Paper stock fibres immersed in water open to atmospheric influence are wetted to saturation principally by slow, time consuming capillary action and hygroscopic absorption, and power, as conventionally applied, being not a function of fibre saturation, is ineffective, wasteful and detrimental to unsaturated and to incompletely saturated fibres.

The term "saturation" as used throughout this application is intended to express that degree of moisture penetration by physical saturation of stock fibres whereby their absorptive powers and affinity for moisture have been sufficiently satisfied, short of hydration in a chemical sense, to bring about that hygroscopic condition which produces the desired lowered resistance of fibres to parting and separation.

All dry paper stock, when immersed in water open to the atmosphere, carries sufficient air to airlock most of the fibre constituents against the invasion of ordinary water. Since the greatest fibre area is protected from direct contact with said water due to this air being locked within and around the fibres, immediate thorough wetting is delayed as may easily be noticed in examining fibres of stock immersed for as much as 20 minutes or more. Before thorough wetting to complete saturation can takeplace this locked-in air must be displaced and/or absorbed by water invading the more concealed portion of the fibres or by capillary action. Both actions are very slow as is apparent on observing the progressive wetting of fibres in any vessel open to the atmosphere.

Under atmospheric conditions moisture absorption and hygroscopic action are dependent upon the entrance of moisture either by capillary attraction or direct contact. Agitation is helpful only as a means of separating the raw stock sheets for better exposure and expenditure of more power than is required for adequate agitation is of little useful purpose. Further expenditure of power on incompletely saturated stock only serves to reduce the physical size of stock pieces rather than causing a separation of fibres, all of which has a destructive effect on fibre length and other physical properties.

Also, dry stock fed into a vat of stock being processed and on which power has already been expended not only contaminates the partially saturated and processed stock, but will also be worked upon in a more unfavorable state or condition.

Very little power is required for the necessary agitation to completely saturate fibres and fibres thoroughly saturated are more thoroughly and rapidly processed without the extensive after-processing by other means, as by Jordans and extensive retention and recycling systems, found necessary in conventional practice.

In general the above objects are attained through the employment of methods, ways and means, examples of which are later more fully described, in which the fibrous stock and fibres are maintained in a condition of free fluid suspension during their subjection to the fibre separating and fibrillating forces, as distinguished from their confinement between rigid crushing, grinding and cutting surfaces characteristic of conventional practice.

In the accompanying drawings,

Fig. 1 is a flow diagram illustratively showing structures and arrangements embodying the invention;

Fig. 2 is a side elevational view, parts being broken away, of a stock saturator and associated parts;

Fig. 3 is an end elevational view looking from the left of Fig. 2;

Fig. 4 is a detail sectional view, on a larger scale, taken substantially on line 4—4 of Fig. 3;

Fig. 5 is a side elevational view, partly in section of a wet fibre separator, screen and associated parts;

Fig. 6 is a plan view of the structure of Fig. 5;

Fig. 7 is a detail sectional view on a larger scale of the stratifying discharge edge of the rotor of the separator of Fig. 5;

Fig. 8 is a similar view of the dividing blade of the stator of the separator;

Fig. 9 is an elevational view partly in section showing a modified form of a wet fibre separator;

Fig. 10 is a diagrammatic plan view of the adjustment features of the structure shown in Fig. 9;

Fig. 11 is a detail view on a larger scale of the discharge edge of one of the non-stratifying rotors of Fig. 9;

Figs. 12, 13, 14 and 15 are side elevational views, partly in section showing modified forms of separators similar in operation to that of Fig. 5 but showing multi-stage operations without stratification and trimming out;

Figs. 16 and 17 are detail views showing combined flow control and combing devices;

Figs. 26 to 38 show alternative arrangements of the abrasive rotor linings and surfaces.

Figure 18:
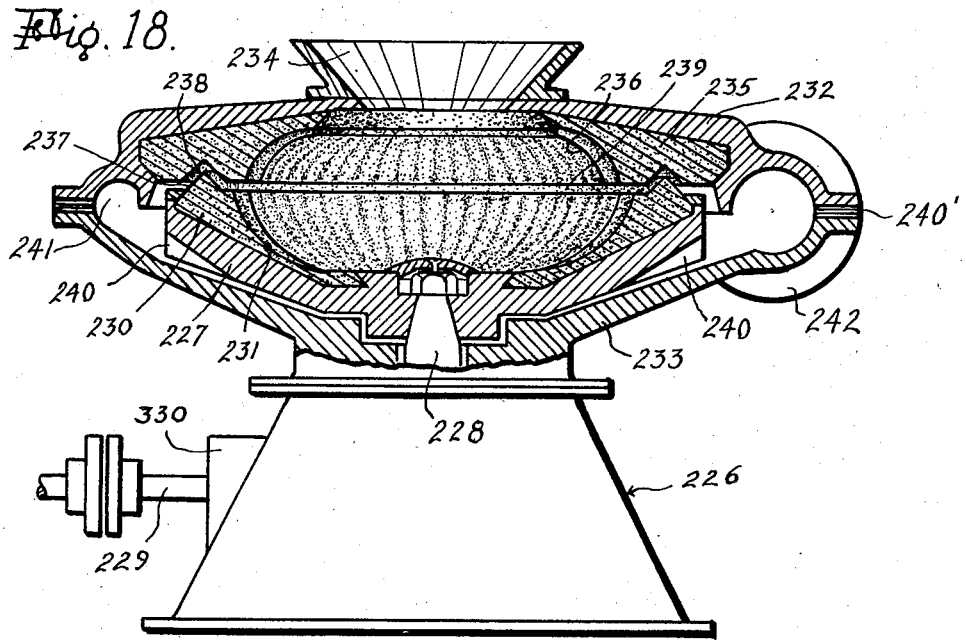
Fig. 18 is an elevational view, partly in section, showing a fibre separator.

Referring to the flowline diagram, Fig. 1, paper stock to be processed is delivered by a suitable conveyer 1, or otherwise, to the saturator, generally indicated at 2, by means of chute 3. If the stock is in baled form, the binding wires are removed prior to the bales reaching chute 3. White water is fed to the saturator through suitable piping, indicated at 6, from a thickener 7 or through pipe 8, from the paper machine, not shown, or from any other suitable source of supply.

Saturator 2 (Fig. 2) consists of a suitably large slowly revolving cylinder 4 of such diameter and other dimensions as to provide the desired rate of stock flow and movement, in a disintegrated soft mushy form, from the cone 5 at the discharge end of the cylinder.

The saturator by the addition of certain accessory equipment, later referred to, may also function as a washer, and a sand, grit and junk remover.

By virtue of its agitating action the saturator also functions as a blender and a mixer of various raw materials during the saturation procedure. This agitation is caused by revolving the saturator which is mounted on suitable supporting rolls 9 which are driven by any suitable means not shown. The interior of saturator cylinder 4 is fitted with suitable agitation spurs 10 extending from its interior surface.

The interior of the discharge cone section 5 of the saturator is fitted with slightly spiraled vanes 11 for continually discharging a stream of saturated stock in "mush" form from the saturator to a screw feeder 12 carried by a shaft 13 at the discharge end of cone 5, and driven by a variable speed motor, or other source of power, not shown. The stock discharges into a rotating screen 14 carried by the cylinder 4 or by shaft 13 or rotated at desired speed in any other suitable manner. Baffles 15 carried by the screen 14 maintain the accepted and rejected stock separated.

The saturator and its associated parts are supported on a frame or platform 18 pivotally mounted at 19, and adapted to be moved to, and held in, adjusted inclined position by the controlled supply of fluid to hydraulic cylinder 20. The degree of saturation and rate of speed of the stock is controlled by the degree of inclination at which the saturator is operated, its speed of rotation and the speed of the discharge feeder screw 12.

The "mushed" stock from saturator 2, accepted by screen 14, is fed by feeder 21 to a wet fibre separating processer, generally indicated at 25 (Fig. 1), in a continuous regulated rate of flow at the consistency desired. Feeder 21 preferably includes a screw 22 through which the stock flows, screw 22 being driven counter current by a motor indicated at 23 to control the flow. Stock that fails to pass screen 14 is discharged to a trough 24 from which it is returned to the saturator or otherwise disposed of by means not shown. Feeder 21 delivers the stock into the funnel 26 of processer 25, Figs. 1 and 5. The fibre separating processer 25 consists essentially, as shown in Fig. 5, of a high speed, dished bowl or rotor 28 provided with an abrasive lining 29. The contour of the lining surface of the bowl rotor 28 is preferably shaped approximately to a parabolic curve from center to rim such that, as the stock is acted upon by centrifugal force, it is continually forced hard against and over the abrasive lining 29. Abrasive lining 29 is corrugated generally radially with preferably rounded ridges 30 and deep valleys 31 of a sharp V shape, as shown in Figs. 5, 6 and 7.

Saturated stock dropping by gravity from feeder 21 to the center of rotor 28 is given a severe combing in its accelerated movement from the center toward the rim. On reaching the rim it has been accelerated to a sufficiently high speed to form a continuous sheet of high velocity which is shot through space to a stationary reverse deflector comber 33 with substantial force. The stationary reverse deflector comber is also abrasive lined as at 34 in a manner similar to the rotor. The energy of the high velocity saturated stock is nearly expended in deceleration over the abrasive combing surface of the reverse deflector 33 such that practically every part and bit of the stock stream is wiped and combed by the abrasive combing lining 34 using up a large part of its dynamic energy. The stock, on leaving stationary dynamic comber 33, possesses enough dynamic energy to create a compressive action on the fibres in the violent concentrated converging cone of stock formed, as indicated at 35, in the open atmosphere above the center of the rotor bowl 28. From the state of intense compressive turbulence in which the kinetic energy has been about expended, the stock again starts its recycle. The stock is subjected to an effective combing action in the first pass over the combing corrugated abrasive surfaces 29 and 34 during its period of acceleration when the combination of centrifugal action and the contour of abrasive surfaces 29 caused the fibres to be wiped and combed under substantial pressure by said abrasive surfaces. The stock is thence released wih high kinetic energy and velocity to the influence of the open atmosphere under expansive influences of a two-dimensional order at the rim of the rotor and is then subjected to further compressive influences and combing action under impingement and decelerating reverse action by the additional abrasive combing surfaces 34. Thence it is released to further expansion under atmospheric influence above the rotor and then to intense compressive turbulence in the bowl. The stock fibres, having been pre-saturated, have been transformed from a state of high resistance to a state of low resistance to separation by fibre characteristic readjustment, and have slipped on and from each other sufficiently to start stratification at least on the second pass over the combing surfaces.

Being of proper consistence, the more separated fibres stratify to the deep, narrow, sharp V's 31 of surface 29 on the second and succeeding passes and on being released therefrom are trimmed out of the high velocity stream by a sharp continuous annular trim blade 36 and are again treated in a manner similar to that above described, over abrasive combing reversing surface 37 (similar to 34) carried by the lower section 38 of the stator by which the kinetic energy is absorbed in further combing action, and from which the fibres pass by gravity to a selective screen 39 through connection 40.

The annular trim blade 36 is conveniently held between the stator sections 33 and 38 as shown in Fig. 8. As shown in Fig. 8. As shown in the latter figure, the blade is secured to a ring 41 held between the stator sections by screws 42 and the bolts 43 which hold the sections together.

The rotor 28 (Fig. 5) is bolted, or otherwise secured, as at 45, to the upper end of a vertical shaft 46 suitably journaled in the base 47 of the separator, and is driven through suitable bearing, not shown, from a drive shaft 48. The rotor 28 is driven at high speeds—1000 r.p.m. or more—the actual speed depending on the character of the stock being worked, and the dimensions of the rotor.

The stator 33—38 is mounted for vertical adjustment relative to the rotor. Any suitable means for accomplishing such adjustment may be employed. As shown the section 33 is provided with three spaced stems 50 which are threaded into nuts 51 rotatably mounted in brackets 52 secured to a flange 53 formed on the separator housing 54. Nuts 51 are provided with sprockets 55 connected by a chain 56. One of the nuts 51 is formed with a worm gear 57 adapted to be driven by a worm 58, journaled in the adjacent bracket 52, and provided with a driving crank 59.

As will be apparent from Fig. 5, raising or lowering the stator 33—38 relative to the rotor 28, varies the point at which the processed stock is "trimmed" from the flowing sheet of stock, thus giving control of the extent of the processing to which the stock is subjected before it is passed to the screen. The stator 33—38 is guided by lugs 60 extending from casing 54 and sliding in ways 61 carried by the stator. A perforated circular pipe 63 supplied with white water from any suitable source, keeps the walls of the casing free of any accumulation of stock. The consistency of the stock for screening purposes may be regulated by the feeding of white water to the processer 25 by a branch line 49 from line 6, Fig. 1.

Any stock fibres insufficiently separated to pass screen 39 and thence to the connection 64 as accepted stock, pass over weir 65 or other suitable regulating gate to pump 66 and are returned for further separation processing by return line 67 having a reheater pipe section 68. Section 68 is jacketed as indicated at 69, steam or hot water being circulated through the qacket by way of pipes 70. An opening 72 is provided at the bottom of weir 65 which opening is controlled by an adjustable gate 73. By this means an accumulation of relatively heavy partially processed stock at the bottom of the screen is prevented, such stock being returned for further processing.

With the bowl 28 traveling at the most desirable speed which, under some conditions, may be a thousand or more revolutions per minute, it can readily be understood that a given unit of stock fibres can be recycled many times per minute in a relatively thin sheet for complete and thorough combing out and subsequently repeatedly subjected to the described actions accordingly as desired until trimmed out as the degree of separation determines the extent of stratification. Under the described influences the fibre separation processing of the pre-saturated fibres is so thorough, complete and rapid that the fibre separator 18 acquires a large capacity as to rate and volume of stock processed with small power input.

Since rotor 28 operates under atmospheric conditions its efficiency is maximum, its power input minimum.

Any desired additional application of heat for further fibre tempering of the rejected stock from screen 39 is made possible by the steam or hot water, or otherwise heated jacket 69. A flow regulating valve 75, which may be activated by the stock level at 76 maintains constant head on stock return pump 66. The pump pressure and the position of valve 75 may advantageously be made such that the stock, as it issues from valve 75 and the discharge end of line 68, is subjected to a substantially expansive force as it is freed to the atmospheric pressure above the rotor 28. This expansive or semi-explosive action tends to further separate and liberate the individual fibres.

From screen 39, Fig. 1, the accepted stock passes to the thickener 7 and thence to stock chest 77 from which it is sent by pump 78 to head box 79.

Fig. 9 shows a modified arrangement for the separator in which additional rotary and stationary abrading members are positioned below the rotary and stationary members previously described. As shown in Fig. 9, two additional bowls 80 and 81 are fixed to the shaft 82 to which bowl 28 is fixed. The upper end of shaft 82 is journaled in a spider frame 83 and the lower end is journaled in the base member 47 and driven as previously described. The rotors 80 and 81 are provided with abrasive linings 84 similar to the lining of rotor 28 except that as best shown in Fig. 11 the upper ends of ridges 85 are flat as at 86 instead of being rounded, since no trimming blades are used on the adjacent stationary members 87 and 88. Stationary members 87 and 88, similar in form, construction and function to section 38 of the previously described stator are mounted in spaced concentric relation to the bowls 80 and 81, respectively. The stators 33, 38, 87 and 88 are abrasively lined and constructed as previously described and are made vertically adjustable with respect to their rotors by a plurality of rods, arranged in groups of three, threaded through the base of the casing as indicated at 90. One group 92 controls the position of stator 38 while groups 93, 94 and 95 similarly control stators 87, 38 and 33. The members of each group are connected for common rotation through respective sprocket chains 96, 97, 98 and 99 in the manner previously described. The upper ends of the rods engage the under surface of the adjacent stator so that upon rotation of the rods the stators are raised or lowered with respect to their rotors for the purposes previously described. Radially spaced lugs 100 extending from the several stators and sliding in ways 101 maintain the stators in concentric position relative to the rotor.

The fibre separating and fibrillating action of the rotors and stators intensified by introducing through pipes 105 controlled quantities of properly graded, grained fibrillating material in the form of granules or pellets. Such granules, pellets or similar formations thus introduced and mingled with the stock act throughout the subsequent movement of the stock to further fibrillate the stock through surface contact between the fibres and the granules in the course of the flow and by impingement and pressure on the fibres as the granules and fibres pass over the abrasive surfaces of the rotors and stators. Those experienced in the art of paper stock processing have realized the difference between fibrillated and non-fibrillated fibres of otherwise similar character, and the superiority of the finished product produced from well fibrillated fibres.

When a fibre separator, such as just described, is introduced into a stock preparing system, as indicated at 106 in Fig. 1, the stock leaving the separator through discharge pipe 107 passes to a pump 108 which delivers it through a three-way valve 109 to a separator 110 which removes the granules for return to the fibre separator 106 by way of line 112 and pipes 105. The stock from which the granules have been separated pass from the granule separator 110 to a head box 113 whence it is sent in controlled amount through line 114 to a screen 115. If desired, stock may be fed from head box 113 through line 116 to pipes 105 for reintroduction with the granules. From screen 115 the accepted stock passes to thickener 117 and chest 118 and by way of pump 119 and line 120 to head box 79. The unaccepted stock from screen 115 is returned by way of pump 121 and line 122 to the fibre separator 106 for reprocessing. In the event that separator 106 is used without fibrillating granules valve 109 may be set so that the stock from discharge pipe 107 is delivered by pump 108 directly to the screen 115.

The principle of the fibre separation operation above described may advantageously be embodied in organized units as diagrammatically shown in Figs. 12 to 15 inclusive.

In Fig. 12 the stock from the feeder 21 of the saturator is fed through the hollow shaft 130 of a rotor 131, having a generally conical surface 132 which is lined as at 133 with abrasive material. The bore of the shaft is provided with screw impeller vanes 134 to forward the stock. The stock spreads centrifugally over the surface 133 and impinges against the curved abrasive surface 136 of a second rotor 135. The shaft 130 carries the rotor 138 of an electric motor, the stator 139 of which is fixed to the casing 140, this integrated motor driving the rotor 131 at the desired speed. The stock passes from the surface 136 by centrifugal action against the curved abrasive surfaces 142 and 143 fixed to the wall of the casing 144 and a member 145 which bridges the outlet 146. An annular cutting blade 147, such as previously described, is mounted between the members 142 and 143 to cut the stock of predetermined degree of separation from the stock stream, the balance passing over the surface 142 and against deflecting surface 148 to a curved abrasive surface 150 carried by the outer surface of the rotor 131. The stock is driven by centrifugal action over surface 150 and is discharged against surface 136 for recycling.

The stock cut from the stream by the knife 147 is driven over the surface 143 and discharged in a generally conical formation terminating near the inner periphery of a third rotor 152. Rotors 135 and 152 are carried by a hollow shaft 153 to which is secured the rotor 154 of an electric motor, the stator 155 of which is fixed to the casing 156, this integrated motor driving rotors 135 and 152 at desired speed in a direction reverse to that of rotor 131.

The rotor 152 is provided adjacent its inner periphery with curved vanes 158 by which the stock is centrifugally driven over abrasive surface 159 to be discharged at the outer periphery of the rotor against the curved abrasive surface 160 which redirects the stock radially inwardly in the direction of a relatively narrow shoulder which is provided with radial discharge openings 161 which communicate with the passage 162 through the shaft 153.

White water is supplied to the passage 162 from any suitable source and under desired pressure to cause impact and turbulence.

In Fig. 13 a modified arrangement is shown in which the rotors 135 and 152 are provided with stock driving vanes 164 and 165, the vanes 158 being omitted if desired. A fourth rotor 166 is carried by shaft 153 between rotors 135 and 152, and fixed curved abrasive surfaces 167 and 168 are provided to respectively direct the stock from the vanes 164 to rotor 166, whence it passes to rotor 152, and from rotor 152 to the vanes 165. In this arrangement the white water entering through passage 162 is discharged through radial openings 169 against the stock as it leaves surface 160.

In Fig. 14 a construction is shown in which the stock is fed to a sump or reservoir 170 from which it is drawn upwardly by an annular screw 172 formed on the interior surface of a hollow shaft 173 and discharged adjacent the center of a bowl rotor 174 similar in construction to rotors 28 or 80 previously described. Rotor 174 is fixed to the upper end of shaft 173. Shaft 173 carries the rotor 175 of an electric motor, the stator 176 of which is carried by the fixed casing 178, by which shaft 173 is rotated thus driving feed screw 172 and rotor 174. Rotor 174 is abrasively lined as indicated at 180 and the stock discharged at its periphery impinges against stator 181 having a curved abrasive face 182 which directs the stock to a stationary central funnel 183 concentric with the bowl rotor 174. The funnel 183 is secured at the upper end of discharge pipe 184 which extends axially of hollow shaft 173 and forms the inner surface of the annular passage in which screw 172 operates.

Fig. 15 shows an arrangement in which the stock is processed through successive concentric stages formed by opposed rotors. In the arrangement of Fig. 15 the stock enters through a passage 190 formed in the shaft 191 of a rotor 192. The inner end of passage 190 is flared and abrasively lined as indicated at 193. The stock discharges from the flared end of passage 190 into a first abrasively lined bowl 194 of a second rotor 195 carried by a shaft 196. From the periphery of bowl 194 the stock discharges to an abrasively lined bowl 197 formed in rotor 192 which in turn discharges it at its periphery to an abrasively lined annular bowl 198 formed in rotor 195. Bowl 198 discharges the stock peripherally to an abrasively lined annular bowl 199 formed in rotor 192 which similarly discharges the stock to annular abrasively lined bowl 200 formed in rotor 195. From the periphery of bowl 200 the stock is discharged to a final annular abrasively lined bowl 201, formed in rotor 192, which discharges it peripherally against a curved abrasive stator surface 202 which directs it into an annular groove 203 formed in the peripheral surface of rotor 195. Generally radial vanes 204, similar in function to vanes 164 and 165 of Fig. 13 drive the stock against the curved abrasive surface 205 which, with surface 202, are carried by the stationary casing 206. It will be understood that the inclined surfaces opposite vanes 164, 165 and 204 may be abrasively surfaced if desired. Rotor 195 is provided with radial passages 208 which are supplied with white water from passage 209 in the shaft of rotor 195 for the purposes previously described with reference to passages 161 and 169.

Where waste paper is used in the furnish, as in the manufacture of paper board products, the saturator 2, which supplies stock to any of the fibre separators above described, may be constructed to provide means for removing sand, grit and junk, as previously mentioned and as shown in Figs. 2 and 3. For this purpose the perimeter of the shell of the saturator, near the inlet end is provided with a plurality of openings 210 for the discharge of sand, grit and junk into a semi-annular chamber 211 which is fitted around the lower half of the saturator opposite the openings 210. A conduit 212 leads from chamber 211 to a vertical cylindrical chamber 213 and is provided with a screw 214 driven counter current by a motor 215 to control the flow. Sand, grit and junk are discharged by gravity through openings 210 into chamber 211 and pass through conduit 212 into a screen system 216 located at the bottom of chamber 213 which catches all coarse material, sand and grit arrested in the screen system, the finer particles being bled out through a valve 219. White water from thickener 7 is conducted through line 6 by a pump 220 to chamber 213 at a point slightly above the normal operating level in the saturator.

Semi-annular chamber 211 is fixed to the frame 18. To prevent leakage between the revolving shell of the saturator and stationary chamber 211 hollow rubber packing 221 is fitted between semi-circular channels 222 and 223, respectively, fixed to the revolving shell 4 of the saturator at opposite sides of the openings 210 and to the edges of chamber 211. The packing 221 may be secured to channels 223 and may be pressurized sufficiently to make a water-tight seal between the revolving shell 4 and the stationary chamber 211.

The several structures and their arrangement above described prepare stocks of the type which are characteristically prepared by pulping. Provision is also made for the reduction of rag and similar sources of fibrous material, for blending with the stock prepared as previously described.

Referring to Figs. 1 and 18, rags, for example, as received from bales or after sorting, are delivered by a conveyer 225, or otherwise, to a processor generally indicated at 226.

Processer 226 as shown in detail in Fig. 18 comprises a high-speed rotor 227 secured to a vertical shaft 228 which is driven from shaft 229 through gear box 330. Rotor 227 is lined with suitable abrasive lining 230, which may be in blocks or sections, of proper grain and grit for most effective combing action. The surface of lining 230 is formed with a plurality of radiating curved ridges 231 generally similar to those of the separators previously described. Rotor 227 rotates within a casing formed of upper and lower members 232 and 233. The upper member 232 is provided with a stock receiving opening 234 and its inner surface is lined with abrasive blocks 235 having curved ridges or corrugations at 236.

The abrasive lining 230 attached to rotor 227, in addition to having corrugations on the primary working face, also has a continuous annular projection 237 V shaped in cross section which opposes a stationary inverted annular V shaped groove 238 formed in lining 235. The desired clearance 239 between the projection and walls of the groove is provided by shims 240'.

The corrugations on both 230 and 235 are very similar in shape to those of lining 29 of rotor 28 of fibre separator 25 previously described. Preferably the abrasive linings 230 and 235 are also so made that the tops of the corrugations of 231 at their inner perimeter are of approximately the same diameter as the base of the V's at the outer perimeter of corrugations 236. Also, the contour of the working faces of the corrugations 231 and 236 are rounded so as to form curved V's with each other at their perimeter.

Rag stock, either in dry, damp or wet condition, is fed into the funnel 234 and drops onto the high speed rotor 227 and is subjected to a severe combing action by virtue of the abrasive corrugations described as the material is driven by centrifugal action in accelerating movement thereover.

The material being acted upon by centrifugal action is also acted upon by the decelerating effect of the stationary abrasive corrugations of 227, such that the opposing forces of acceleration and deceleration of the material under centrifugal pressure at full perimetrical speed is subjected to a severe combing action. The rolling action under centrifugal pressure is in direct ratio to the centrifugal forces which in turn are in ratio to the speed of rotor 227. The combination of forces is unlike any combination of conventional mills or burr arrangement.

The fibres that are combed out of the fabric under the forces described stratify into the deep V's and are impinged against the flat end surfaces of the stationary abrasive 235, thence by centrifugal action against the V projection 237. By centrifugal action the fibres are further combed between the V faces of the annular passage 238 emerging at the rotor outer perimeter in a thoroughly separated condition.

By virtue of impeller action caused by vanes 240 formed on the lower face of the rotor 227, the fibres are air borne to and through annular passage 241 and through connection 242 to booster blower 243 (Fig. 1) to four-way air duct gate 244.

Depending upon the grade and type of product, the utilization of processer 226 may be varied to meet differing manufacturing requirements. In the manufacturing of high rag content high grade papers, the manual cutting or piecing operation by the rag sorters may be eliminated since processer 226 will handle pieces of large dimension and the stock may be conveyed from gate 244 either to bleach boiler 245 and drainer 246 directly, or to storage for loading the bleach boiler or, where bleaching is not desired, may be diverted to a dry storage bin 247 or to wet machine 248 for converting to wet lap for more convenient wet lap storage.

With regard for the manufacturing requirements as to a particular type of product, the defibred material, whether reclaimed from bulk storage, wet lap storage, cooker or drainers or combination thereof, is fed to saturator 250 by virtue of conveyor 251, or otherwise.

In Fig. 1, saturator 250, which is the same or similar construction as saturator 2 previously described, is shown as supplying the separator 106, and functions similar to saturator 2 in the saturation of the fibres, mixing and blending in preparing the stock for separator 106. Fig. 1 illustrates the flexibility of the novel processing methods and devices described. The saturator 250 is shown as supplying the separator 106 for which of course may be substituted any of the previously described forms. The stock from pump 78 or 119 or both is delivered to the head box 79 as previously described. From head box 79 the stock in the desired proportions may be delivered to a blender refiner as indicated at 255 which discharges it to a chest 256, and other portions may be returned through lines 257 and 258 to chests 77 and 118 respectively for recirculation. From chest 256 the blended stock is delivered by pump 259 and line 260 to a head box 261, from which a portion passes to a screen 262, the accepted stock from which is sent by line 263 to the paper machine, while the rejected stock is sent via a three-way valve 264 and lines 265 and 266 respectively to processers 25 or 106 or in desired proportions to both. Line 267 permits recirculation from head box 261 through chest 256.

Figure 19:
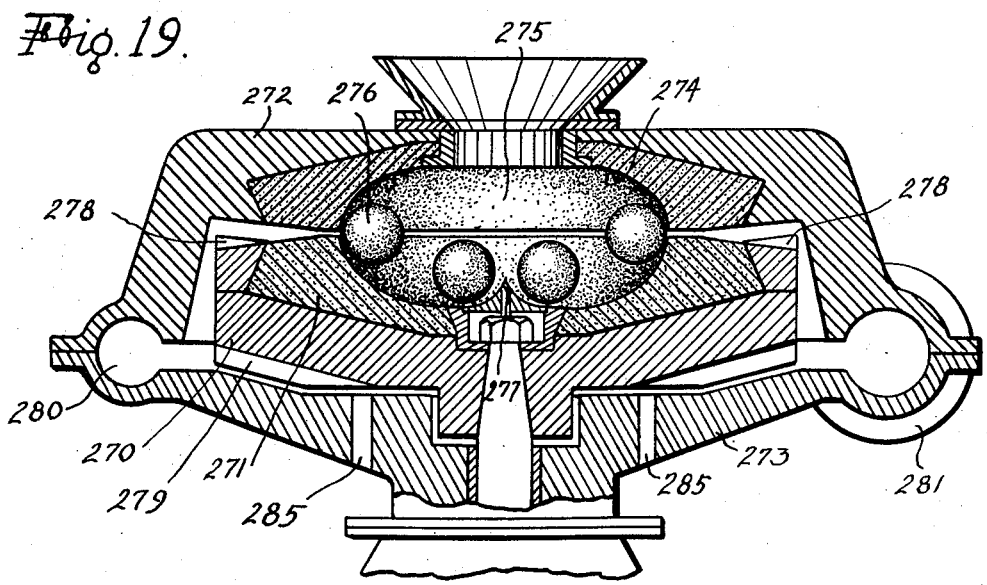
Figs. 19, 20 and 21 are similar views showing modified forms of separators.

Fig. 19 discloses a modified form of fibre separator similar to that of Fig. 18. In Fig. 19 a rotor 270 carrying the abrasive lining 271 is similarly rotated in a housing formed by upper and lower members 272 and 273. The upper member 272 is provided with an abrasive lining 274 forming the stator, the edges of the rotor and stator being spaced to provide an annular passage 275 outwardly of their periphery. Moving freely within the chamber formed between the stator and rotor are a plurality of balls 276 formed of abrasive or other suitable material, which under centrifugal force generated by the rapidly rotating rotor move outwardly with the stock as the latter passes over the abrasive surfaces, increasing the fibre separating by their abrasive contact and impact. Preferably the center of the rotor is provided with a curved cone formation 277 to better control the movement of the balls in their circulation through, over and with the stock from rotor to stator and back. The separated fibres pass outwardly through the annular passage 275 under centrifugal action and the suction created by a multiplicity of radial vanes 278 formed on the upper surface of the rotor at the outer periphery of the passage. Through the action of vanes 278 and the impeller action of similar vanes 279 formed on the lower surfaces of the rotor the separated fibres are air borne to and through an annular passage 280 to discharge connection 281 as previously described. Passages 285 provide an inlet for air to the vanes 279.

Figure 20:
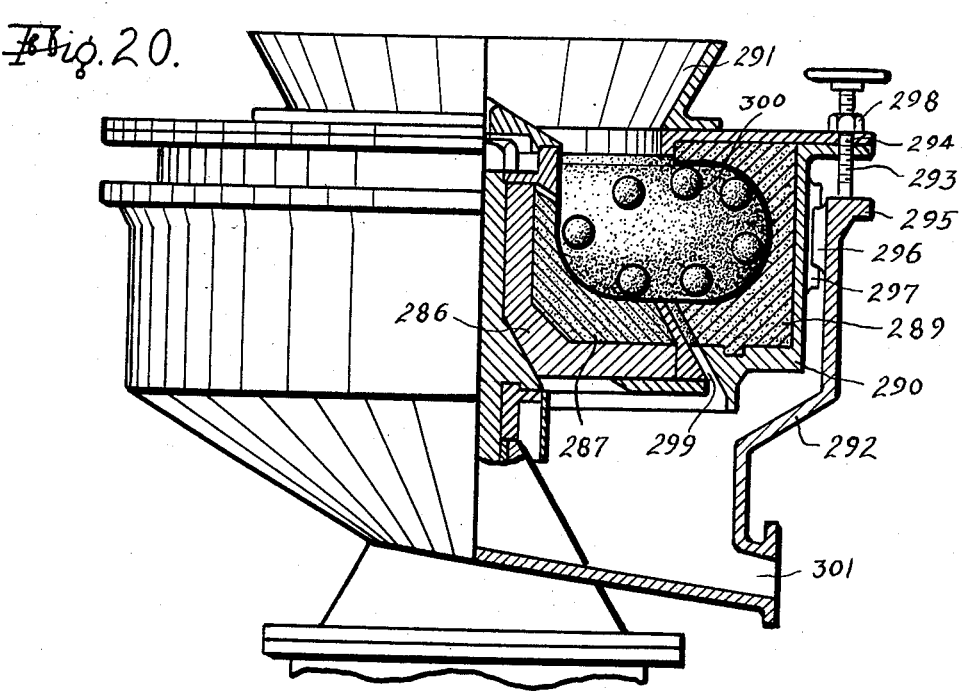
Figure 21:
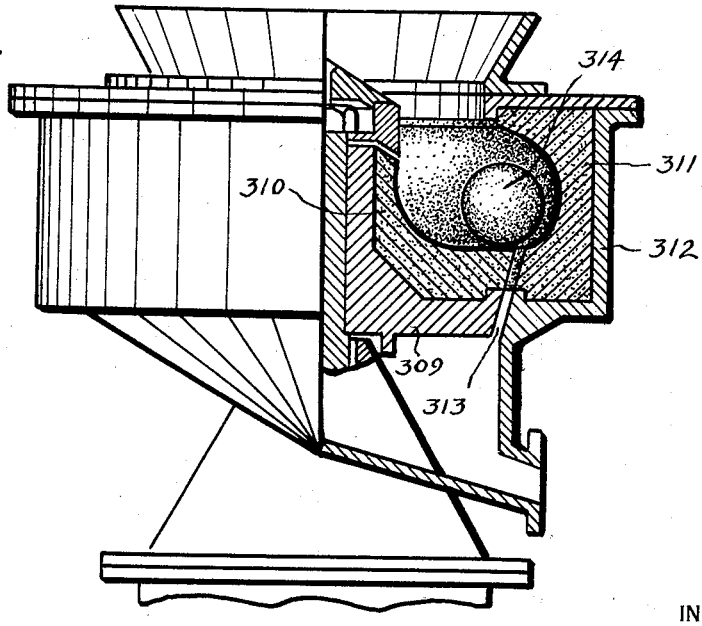

In Figs. 20 and 21 are shown fibre separators, operating on the same general principles as that of Fig. 19, in which the separated fibres are discharged by gravity, and better adapted for moist or wet processing. In Fig. 20 the rotor 286 carries an abrasive lining 287 sloping to a generally flat peripheral portion spaced from the lower edge of the abrasive annular stator member 289 which curves upwardly and inwardly. The member 289 is carried by an annular member 290 which carries the stock receiving funnel 291. Member 290 is adjustably supported by the outer casing 292 by means of a plurality of spaced rods 293 threaded at 294 through the peripheral portion of the member 290 with their lower ends engaging a flange 295 formed around the rim of the casing 292. Cooperating guides 296 and ways 297 carried respectively by the casing 292 and member 290 prevent relative rotative movement between member 290 and the casing and maintains member 290 centered relative to the casing. Lock nuts 298 hold the rods 293 in adjusted position. Rotor 286 is rotated in a manner and by means similar to those described relative to Fig. 18. The stock is driven by centrifugal action over the abrasive surface 287 across the annular opening 299 between the rotor and stator and along and over the abrasive surface of stator 289 which returns it in decelerated condition to the rotor. A plurality of balls 300, preferably smaller in size but functioning in manner and purpose the same as balls 276 previously described move freely in, through, with and against the stock under centrifugal force generated by the rotor as the fibres separate out of the stock they drop through the passage 299 to the lower portion of the casing whence they are discharged through opening 301. The degree of separation of the fibres cut or removed from the stock through opening 299 may be adjusted by the vertical adjustment of member 289.

The separator of Fig. 21 comprises a rotor 309 abrasively lined at 310 and an abrasive stator 311 similar to those of the form previously described except that the stator is mounted in casing 312 in fixed relation position relative to the rotor and the annular escape passage 313 is positioned nearer the rise of the stator wall so that a more abrupt change of direction and a greater impact is imparted to the stock as it leaves the rotor and engages the stator. Furthermore the annular passage 313 is inclined inwardly instead of outwardly as in the form of Fig. 20, resulting in less tendency for partially separated fibres to enter the passage and a higher order of separation in the discharged stock. Fig. 21 also illustrates at 314 the use of relatively large balls having a sufficiently large diameter to preclude the presence of more than one at a given radial cross section of the annular chamber formed by the rotor and stator. This arrangement provides a greater degree of rolling abrasive action relative to the action of impact which is preferable and more efficient in the separation of some types of fibres.

The apparatus so far described is particularly designed for continuous flow systems in which the stock is processed in a continuous operation, the machines of Figs. 19, 20 and 21 like that of Fig. 18 being designed to constantly discharge the defibred and fibrillated product into a saturator such as 250, Fig. 1, which forms part of a continuous stock preparatory system. In such a system continuous repeated combing action is obtained by the controlled flow of stock over, to and from moving and stationary abrasive surfaces, so arranged that impact as well as movement characterize the fibre separating and fibriliating combing of the stock by the abrasive surfaces, and stratification avoids the excessive use of screens.

This combing action of abrasive surfaces may advantageously be imparted to the stock in combination with expansion and impact at such points as valve 75 in the return feed of Fig. 5. Two valve constructions for that purpose are illustrated in Figs. 16 and 17.

In Fig. 16 the flow of stock in pipe 319 engages the flared end 320 of a pipe 321 concentric with pipe 319. The end of pipe 319 is similarly flared at 322 and abrasively lined as at 323. A fitting 324 has a reverse flare which is abrasively lined as at 325. As the stock passes downwardly (as viewed in Fig. 16) it is forced between the flared ends 320 and 322 and over the abrasive surface 323. The pressure with which the stock passes through the conical opening between the flared surfaces may be controlled by adjusting the pipe 321 axially of pipe 319, thus changing the size of the opening. White water is supplied to pipe 321 from any suitable source, and the white water is projected under pressure through an annular opening 326 between the end of pipe 321 and a valve member 327. Valve member 327 is carried is carried at the end of a valve stem 328 by which the size of opening 326 may be controlled. The white water escaping from opening 326 strikes the flowing stock and forces it against the abrasive surface 323 increasing the combing action and the separation of the fibres and their fibrillation both by pressure and impact.

In Fig. 17 the end of white water pipe is shown formed with a double cone, the outer surface of the upper cone being provided with an abrasive surface 340 between which and the flare 322 of pipe 319 the stock flow passes. In this form the white water escapes through fixed openings 341 formed in the lower cone 342 to impinge against the stock as it flows over abrasive lining 325 of fitting 324.

Figure 22:
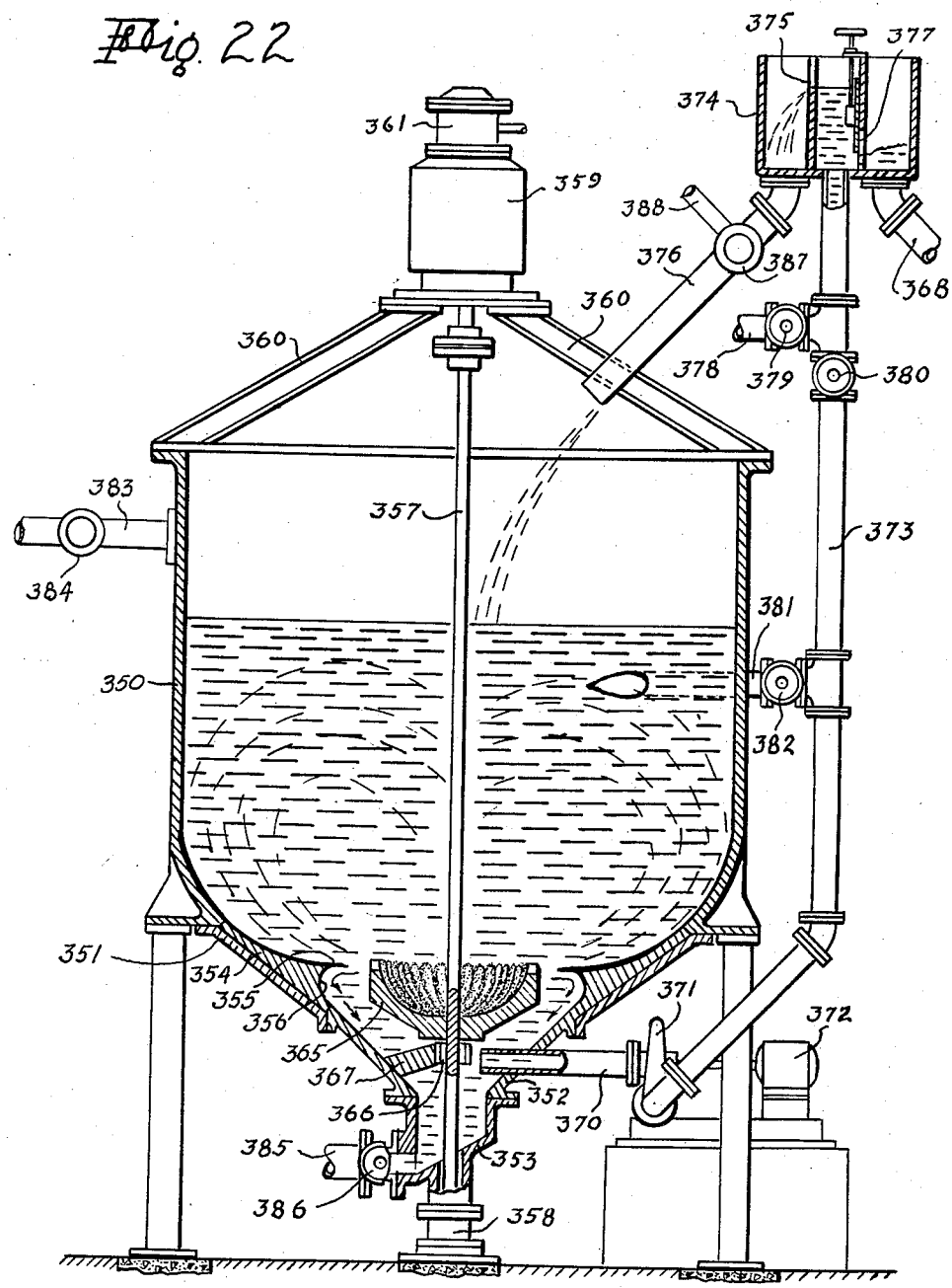
Fig. 22 is an elevational view partly in section showing a batching chest embodying the invention.

In some installations it is desirable to hold a given quantity of fibre stock mixture as a batch for extended processing or the addition of color or other purposes. In Fig. 22 is shown a processer in the nature of a chest which comprises an upper cylindrical portion 350 and a lower generally conical portion which is formed of three sections 351, 352, and 353. Section 351 carries an abrasive lining 354 provided with an annular knife edge 355 and an annular curved stator portion 356 below the knife trim edge.

Extending axially of the so-formed vessel is a vertical shaft 357 having its lower end resting on a suitable guide bearing indicated at 358, and connected at its upper end to a gear head motor 359 which is supported by a plurality of beams 360 carried by the rim of section 350.

Any suitable means are provided for vertical adjustment of shaft 357 such as an hydraulically adjustable bearing with a suitable cylinder as indicated at 361.

Adjacent its lower end, shaft 357 carries an abrasively lined rotor bowl 365 similar in all essential respects to rotor bowl 28 previously described. Just below the bowl 365 shaft 357 passes through a suitable guide bearing 366 supported by one or more brackets 367.

An outlet pipe 370 extends outwardly from the casing to a pump 371 which as shown is driven from a motor 372. Pump 371 discharges to a pipe 373 which delivers stock to a head box 374 provided with a weir 375 over which stock may be discharged through pipe 376 back to the chest, and with a gate valve 377 through which the stock may be delivered in whole or in part to succeeding processing devices or the paper machine through a pipe 368. An inlet pipe 378 connects with pipe 373 through a valve 379, and a valve 380 is positioned in pipe 373 just below the connection of pipe 378 with pipe 373. A branch pipe 381 connects pipe 373 directly with the chest through a valve 382. An inlet pipe 383 controlled by a valve 384 is provided by which the vessel may be directly charged with stock.

In one mode of operation the vessel 350 is charged with stock through pipe 383 from any suitable source. Valves 384 and 380 are closed and valve 382 is open. Motors 359 and 372 are started to drive rotor 365 and pump 371.

The bowl of rotor 365 is of course full of stock, and upon its rotation the stock is driven by centrifugal action outwardly of its perimeter and through the stratifying grooves at its edge, the lower strata of stock being "trimmed out" by knife 355 and directed downwardly over the stator surface 356 and to the chamber beneath the bowl whence it is taken through pipe 370 by pump 376 and returned via pipe 381 to the vessel. That portion of the stock discharged by the rotor which is driven outwardly above knife edge 355 is directed outwardly over the curved abrasive surface of the lining 354 and produces a current toward the center of the vessel which with the tangential current produced by stock returning through pipe 381 produces a downwardly spiraling current of the stock back to the rotor.

While the device is thus in operation, stock may be flowing through pipe 378 into the head box 374 and through valve 377 onward in a general processing system, any surplus of the flow being discharged over weirs 375 and by way of three-way valve 387 and pipe 388 to its point of origin. With valves 379 and 381 closed and valve 380 open the worked stock may be discharged as a batch through the head box to the general system, a subsequent processing machine, or it may in part be returned to the vessel via pipe 376. Color or other desired material may be added to the stock in the vessel as desired. As previously explained, vertical adjustment of the rotor controls the extent to which the stock discharged from the rotor will be trimmed out by the knife. Sand and grit or unworked material accumulating at the base of the vessel may be removed through a pipe 385, controlled by a valve 386.

Figures 23, 24:
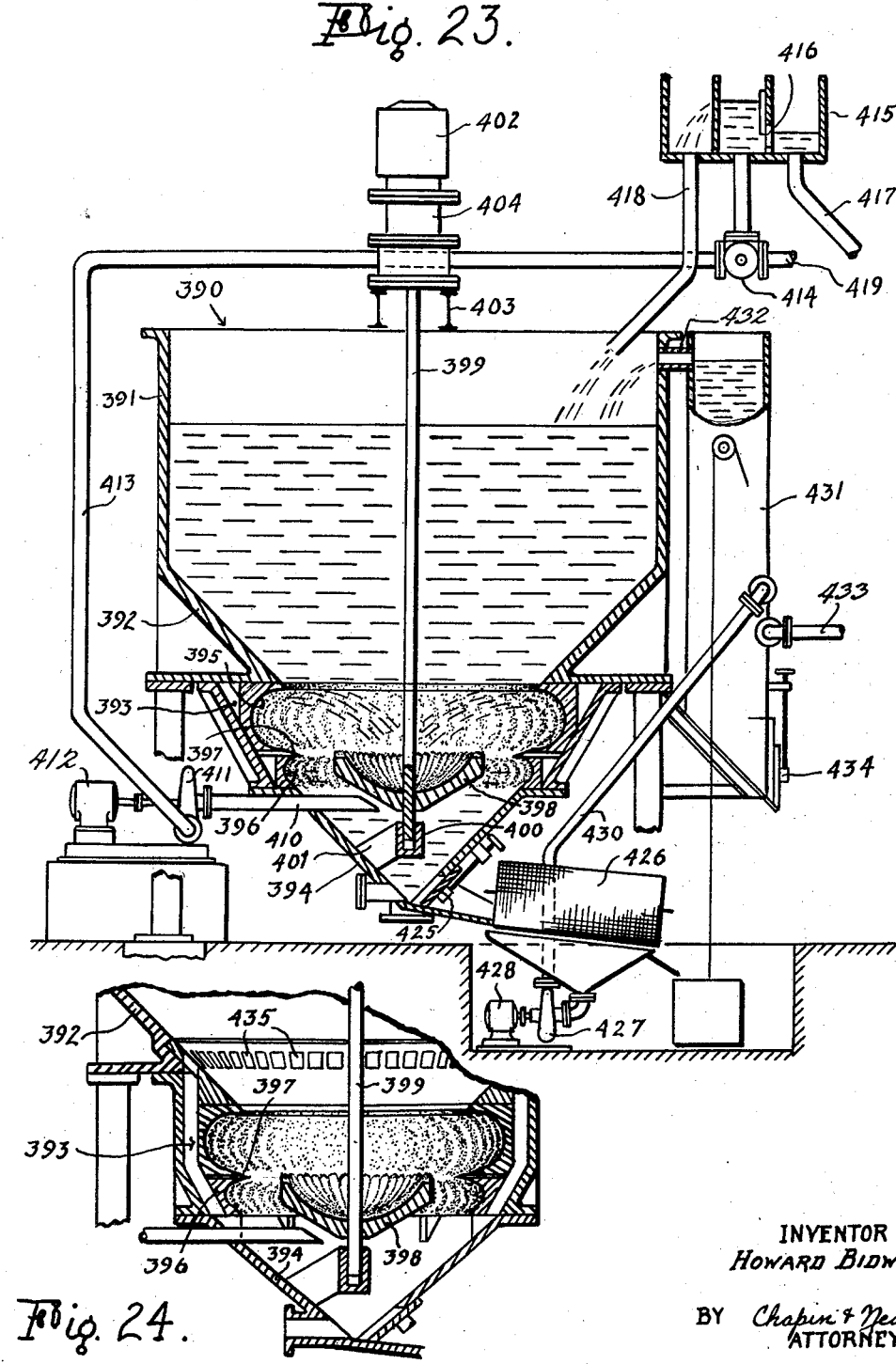
Fig. 23 is a similar view of a similar unit combining a saturating action with the separator.
Fig. 24 is a detail sectional view of the lower portion of Fig. 22 showing a modified arrangement for the removal of grit and junk.

In Fig. 23 is disclosed a unit similar to that of Fig. 22 but combining structure to afford a more discrete saturating action. In the structure of Fig. 23 the vessel 390 comprises an upper cylindrical portion 391, a frustroconical portion 392, an abrasive surfaced stator 393 and a bottom conical portion 394. The stator, similar in construction and operation to those previously described, includes a curved annular upper portion 395 and a curved annular lower portion 396 separated from the upper portion 395 by an annular knife 397. An abrasive stratifying rotor 398 similar in form and function to those previously described is secured to a vertical shaft 399, the lower end of which is adjustably mounted in a bearing 400 carried by a spider bracket 401. The shaft 399 is driven from its upper end by a gear head motor 402 supported on beams 403, the shaft being vertically adjustable by means of an hydraulic cylinder 404.

The vessel is charged with stock in any suitable manner and is subjected to saturation in the chamber 391 whence it passes by gravity through the section 392 to the separator comprising the stator 393 and rotor 398 and their associated parts. The stock in passing through the separator is subjected to abrasive combing, fibrillation, stratification and separation in the manner previously described, the agitation being substantially confined to the separator, the bulk of the stock in the upper chamber being subject only to such internal movement as is conducive to efficient saturation.

The separated fibres trimmed out by the knife 397 is directed by the surface 396 inwardly below the rotor where it is discharged as desired through a pipe 410, pump 411 (driven by a motor 412) and pipe 413 through a two-way valve 414 to a head box 415 whence it is discharged through gate 416 and pipe 417 or in part returned to vessel 390 via pipe 418.

Valve 414 is adapted to shut off pipe 413 and admit stock to the head box through pipe 419 thus indicating that the device may, if desired, be integrated into a general system. Stock flowing through pipe 419 may in part be introduced to vessel 390 and in part forwarded through pipe 417.

Grit and junk collecting in the lower chamber 394 may be discharged through gate 425 to a screen 426. Acceptable stock passing through screen 426 is forwarded by a pump 427 (driven by a motor 428) through pipe 430 to an auxiliary chamber 431 whence it is overflowed through connection 432 to the vessel 390. Chamber 431 serves as a settling chamber for fine grit or sand passing screen 426 and the settled material may be removed through gate 434. White water or other material may be introduced to chamber 431 through a pipe 433 if desired.

In Fig. 24 a modification of the combination of Fig. 23 is shown in which the wall of the frustroconical section 392 is provided with openings 435, which may be inclined to overlap each other if desired, through which junk may pass outwardly of the stator and rotor directly to the chamber 394, thus minimizing wear or damage to the abrasive surfaces. The position of openings 435 and the currents in the upper chambers assure that most of the junk will gravitate to the inclined walls of chamber 392 and will be by-passed around the separator by the openings 435.

Figure 25:
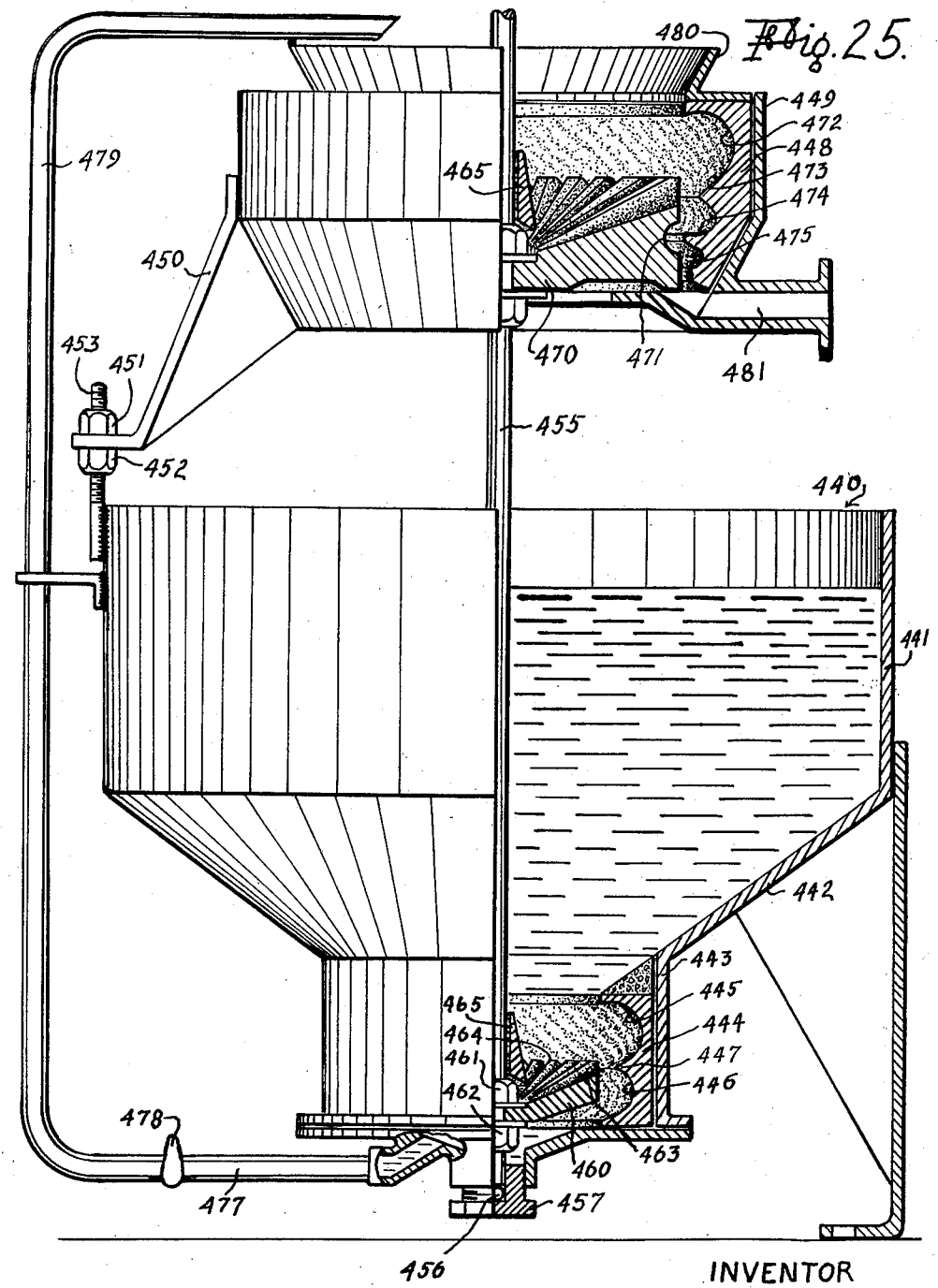
Fig. 25 shows a two-step separator combined with saturation as in Fig. 23 using a modified form of separator.

In Fig. 25 is shown a unit in which two stages of abrasive separation, stratification and fibrillation, with adjustable trim out, are provided, using flat ribbed conical rotors, together with a saturation chamber similar in operation to that shown in Fig. 23. A vessel 440 which includes a saturating chamber 441, an intermediate frustroconical chamber 442 and a lower chamber 443, the latter embracing an abrasive stator 444 comprising curved upper and lower sections 445 and 446, separated by a knife section 447. A second abrasive stator 448 is mounted above the vessel 440 in coaxial relation with stator 444. Stator 448 is carried by a chamber structure 449 adjustably supported by a plurality of brackets, one of which is shown at 450, from the top of vessel 440. As shown the brackets are held between nuts 451 and 452 threaded on rods 453 welded to the rim portion of vessel 440. A vertical shaft 455 extends axially of the stators, its lower end resting on a ball step bearing 456 mounted in a cylindrical bearing housing 457 threaded, for vertical adjustment of the shaft, in the bottom of chamber 443.

Fixed to shaft 455 centrally of stator 444 is an abrasive rotor 460 secured to the shaft between nuts 461 and 462. The rotor 460 as shown is generally conical in shape and is provided on its inner surface with ribs 463 having flat surfaces 464 and sides inclined to form V shaped stratifying grooves between the ribs. A collar 465 of abrasive material surrounds the shaft and nut within the rotor and extends upwardly of the shaft.

A second rotor 470 is fixed to the upper portion of the shaft. The rotor 470 is similar in construction and form to rotor 460 except that as shown it is larger and is provided around the lower portion of its periphery with a curved annular combing groove 471. The stator 448 is formed with a curved section 472 separated by an annular trimming edge 473 from a lower section 474 from which in operation stock is directed to the combing surface 471 which in turn directs it back to a third combing section 475 of the stator.

In operation the vessel 440 is charged with stock in any suitable manner. In the section 441 the stock is subjected to saturation to hygroscopically condition the stock as previously described. The saturated stock gravitating to rotor 460 is combed and stratified, the more separated fibres being trimmed out by knife 447 and passed over the combing surface of section 446. The stock then passes through pipe 477 to a pump 478 which discharges it through pipe 479 to the upper rotor through a funnel 480 supported by the stator. The stock after being subjected to multiple combing action and stratification by the rotor 470 and stator 448 as described is discharged through opening 481.

As will be apparent, the arrangement of Fig. 25 gives a broad range of adjustment and control in the treatment of the stock. By adjusting bearing housing 457 the shaft is raised or lowered and with it the rotors 460 and 470. Rotor 460 is thus adjusted relative to knife 447 to control the trimming out of the stratified stock. The upper stator 448 is then adjusted relative to upper rotor 470 by means of the adjustment 451—452—453 to secure the desired trimming action of knife 473 relative to the stratified stock discharged from the periphery of rotor 470. The shaft 455 is driven in any suitable manner as by a motor, not shown. The rate of discharge of the stock through pipe 477—479 may be controlled, as by varying the speed of the pump. The stock is thus subjected to a submerged combing in the lower separator unit and to open combing in the upper unit, the trimming in each unit being independently adjustable, and the degree of pre-saturation being controlled by the rate of flow of the stock from one unit to the other.

The abrasive elements herein referred to may be formed from any suitable abrasive material, such as those commonly used for grinding wheels and similar purposes. Abrasives of this character comprise an aggregate of hard grit or particles held together by a binder, and cast, molded or otherwise shaped to the desired form, and this mode of manufacture may be followed in the production of abrasive members for the carrying out of the present invention. Since, however, the abrasive as used for the purposes above described are not subject to the high operational temperatures met with in grinding and other similar operations for which abrasives are commonly used, the binders used may be modified as found possible or desirable for cheapness in manufacturing the abrasive members. The binder employed should have the strength characteristics to resist the high speeds at which the rotors operate and the chemical characteristics to resist the chemical constituents characteristically met with in pulp and paper manufacturing processes. The size and character of the aggregate may be varied so as to provide maximum fibre separation and fibrillation, having regard to the particular type and source of the fibres being acted on and the degree of separation attained at any particular stage of their processing.

While the surface characteristics of the rotors, stators and other elements are those commonly recognized and best described as "abrasive" it will be understood that for the purposes of the present invention it is the characteristic abrasive surface configuration coupled with sufficient wear resistance for the functions described that are essential, and that such "abrasive surfaces," cast, molded or otherwise formed or provided on metallic, vitreous, organic plastic and other materials having adequate strength and hardness characteristics, are included within the term abrasive as herein used.

The fineness or grain of the abrasive surface will depend on the character of the fibres treated and the degree of resistance of the fibres to separation. In general the abrasive characteristic will be selected that give the maximum combing action consistent with avoiding clogging of the interstices of the abrasive.

Having special reference to the aggregated abrasive materials commercially available and the limitations on the size and shape of the forms that can be economically made in conventional practice, the assembly of the rotor linings in the form of segments, sections or blocks presents certain problems in the manner of their assembly in or on the rotors, with respect to the ability of the assembly to withstand high rotative speeds. Without intent to limit the assembly constructions acceptable for the purpose, Figs. 26 to 38 inclusive indicate presently suggested structural assemblies of the abrasive members.

Figs. 26, 27 and 28 show an assembly of unit abrasive blocks 490, each of which comprise one rib, a multiplicity of which form the lining of the rotor bowl indicated at 491. Each block is provided on its inner surface with a rounded rib surface 492 of double curvature with narrow side surfaces 493 of single curvature which form the bottom of the stratifying grooves between the ribs when the latter are assembled. The upper ends of the surfaces 492 join surfaces 494 of single curvature, which extend generally horizontally and provide a predetermined length to the grooves at their discharge end at the periphery of the rotor. The outer faces of the blocks are formed with shoulders 495, and surfaces 496, 497 and 498 which conform to the adjacent supporting surfaces of the bowl 491. An annular (or segmental) fixture 500, secured to the rim of the bowl 491 as by screws 501, is provided with a portion 502 engaging between shoulders 495 of the blocks and the rim of the bowl. Member 500 is also provided with a plurality of integral abutments 503 in the form of semi-cones which engage the ends of the portions 494 of the blocks, the whole providing a strong rigid assembly permitting the use of small abrasive lining blocks without sacrifice of strength in the apparatus.

Figs. 29, 30 and 31 show a modification of the structure just described. In this modification the portion 494 is omitted, the block 505 having a plane surface 506 which is overlapped by projecting members 507 formed integral with fixture 508. The members 507 are formed with rounded inner ends 509, sloping sides 510 and flat upper surfaces 511, the spaces between the members serving as discharge channels for the stratified stock similar to the spaces between members 494.

Fig. 32 shows a rotor construction in which the abrasive member is formed as a unitary disc 515 having a central opening. The member 515 in its formation is provided with a metal backing member 516 to which it is secured in any suitable manner as by dove-tail projections 517. The upper surface of member 515 is formed with radial semi-conical ribs 518. The member is held to the rotor body 519 by machine screws 520 threaded into the backing plate 516 and by a flanged cup 521, cap member 522, and screw 523 which is threaded into the tapered end of rotor shaft 524. Cup member 521 is clamped to the rotor member 519 by nut 525 threaded onto the rotor shaft.

If desired, the member 515 of Fig. 33 may be made in sections as shown at 530 in Fig. 34, and the sections secured in any suitable manner to a flanged cradle 531 having an inner flange 532 engaging a shoulder 533 formed on rotor base 519 and an outer flange 534 which engages the outer peripheral faces of the members 530 to sustain the centrifugal thrust as the members are rotated.

Fig. 36 is a plan view showing a curving formation of ribs as at 540 which, as indicated at 541 in Fig. 37, may be formed sections. An effect similar to the curved ribs of Figs. 36 and 37 may be obtained by making the grooves 542 between the ribs tangential to the hub of the rotor as shown in Fig. 38. In Fig. 36 the V grooves follow approximately the natural path engendered by the centrifugal action, the stock being combed equally along both sides of the groove. In the formation of Fig. 32 the stock tends to follow a path crossing several grooves, while in Fig. 38 the number of grooves crossed is lessened.

The various structures above described show presently preferred arrangements by which the several objects of the invention may be described, and further illustrate the flexibility of application of the several features of the invention in their combination with each other and with conventional techniques in the systematic processing of fibrous stocks.

What is claimed is:

1. Apparatus for preparing fibrous stock for paper making which comprises a generally circular member having an abrasive surface, said abrasive surface being formed with generally radial grooves, means to supply stock to the center of said member, means to rotate said member to drive the incoming stock centrifugally over said abrasive surface and outwardly of the edge thereof to, in part at least, separate the fibres within the stock, and an annular knife-like member spaced from the periphery of the abrasive surface to trim from the stock projected therefrom that portion issuing from the lower portion of said grooves.

2. In an apparatus for preparing fibrous stock for paper making which comprises a circular member having a granular abrasive surface provided with generally radially extending ribs separated by generally V-shaped grooves opening to the periphery of the member and providing stratification of the separated fibres as the stock moves from the center of the member to its periphery upon rotation of the member.

3. In an apparatus for preparing fibrous stock for paper making which comprises a circular member having a concave, granular abrasive surface provided with generally radially disposed rounded ribs separated by the V-shaped grooves opening to the periphery of the member, the ends of the ribs extending above the discharge periphery of the member, said grooves and ribs providing stratification of the separated fibres as the stock moves from the center of the member to its periphery upon rotation of the member.

4. Apparatus for preparing fibrous stock for paper making, which comprises a casing, an annular stator member carried by the casing, the inner peripheral surface of the stator comprising two portions each provided with concave overall granular abrasive surfaces, an annular knife edge positioned between said portions, a shaft mounted axially of the casing, a rotor mounted on said shaft to rotate within and spaced from the annular stator, said rotor having an overall granular type abrasive surface, means to rotate said shaft and means to supply stock to the center portion of the abrasive surface of the rotor.

5. Apparatus for preparing fibrous stock for paper making comprising an upper vessel and a lower vessel, said lower vessel including a stock receiving upper chamber and a lower chamber of less diameter, said upper vessel and the lower chamber of said lower vessel each being provided with an abrasively surfaced annular stator, a shaft extending axially through both vessels, an abrasively surfaced rotor positioned centrally of each annular stator and fixed to the shaft, the abrasive surfaces of said stators and said rotors being of an overall granular formation, said stators each having upwardly and inwardly and downwardly and inwardly curved surfaces to respectively direct one portion of the stock delivered from the adjacent rotor upwardly and inwardly above the adjacent rotor and another portion downwardly and inwardly below the rotor, means to deliver the portion of the stock delivered below the lower rotor to the upper rotor, means to rotate said shaft, means to adjust the shaft vertically, means to adjust the upper vessel vertically relative to the shaft, and means to discharge stock from the bottom of the upper vessel.

6. Apparatus for preparing fibrous stock for paper making comprising a chamber lined with an overall granular abrasive formation, the upper portion of said chamber being stationary, means to rotate the lower portion of the chamber relatively to the upper portion, the adjacent periphery of the portions being in part at least offset from each other, said portions being spaced from each other to permit discharge of the stock from the chamber, and said upper portion being provided with an opening for introducing stock to the chamber.

7. The method of preparing fibrous stock for paper making which comprises saturating the stock with water to lower the resistance of the fibres to separation, circulating the stock, opposing its circulating movement with a granular abrasive surface, contoured to impose varying degrees of surface contact pressure on the stock, to induce separation of the fibres, constantly removing from the circulating stock, fibres of a predetermined degree of separation, screening from the removed stock the acceptably free fibres, placing the balance of the removed stock under hydrostatic pressure and returning it to the circulating body of stock with an abrupt release of pressure.

8. Apparatus for preparing fibrous stock for paper making which comprises a chamber having inner granular surfaces, a granular surfaced rotor forming the bottom of the chamber, the periphery of the rotor being spaced from the adjacent wall of the chamber to form an annular opening therebetween, means to drive the rotor, the upper wall of the casing being provided with an opening for admitting stock to the center of the rotor, the inner wall surfaces of the chamber being curved outwardly, upwardly and inwardly to direct the stock, driven across said annular opening by the rotor, back to the central portion of the rotor and means to divert through said annular opening at least a portion of the individualized fibres combed from the stock aggregate by its flow over the granular surfaces.

9. Apparatus as in claim 8, the surface of the rotor being upwardly and outwardly inclined from its center to lengthen the path of travel of the stock over the surface thereof, and increase the pressure of the stock against the granular surface of the rotor.

10. Apparatus as in claim 8 including means to vary the amount of individualized fibres diverted through the annular opening.

11. Apparatus as in claim 8, the surfaces of both the chamber and rotor being contoured to increase the length of the path of travel of the stock thereover and vary the pressure of the stock thereagainst.

12. Apparatus as in claim 9, the surface of the rotor being formed with generally radially extending ridges forming valleys therebetween, the valleys increasing in depth toward the periphery of the rotor to effect stratification of the separated fibres, as the stock flows from the center of the rotor to its periphery.

13. Apparatus as in claim 10, the last-named means comprising means to adjust the vertical relation of the chamber and rotor.

14. Apparatus as in claim 13, said adjusting means comprising a plurality of screws supporting the chamber independently of the rotor and means to simultaneously rotate said screws to raise or lower the chamber with respect to the rotor.

15. Apparatus for preparing water borne fibrous stock for paper making which comprises a generally cylindrical chamber open at the top and bottom and having its inner surfaces formed of granular material, said chamber being divided into upper and lower sections, a rotor positioned intermediate said sections and forming the bottom of the upper chamber section, the periphery of the rotor being spaced from the adjacent wall of the chamber to form an annular opening from the upper chamber section to the lower chamber section, the peripheral portion of the rotor extending downwardly into the lower chamber section and forming the inner wall of the lower chamber section, the surfaces of the rotor being formed of granular material, means to drive the rotor, the wall of the upper chamber section being curved outwardly, upwardly and inwardly to direct the stock, driven across said opening by the rotor, back to the central portion of the rotor, the wall of the lower chamber section being curved outwardly, downwardly and inwardly to direct stock passing through said opening toward and against the peripheral surface of the rotor, and means to limit the passage of stock through said opening to stock of a predetermined degree of fibre separation, said lower chamber section forming means to effect further fibrillation of the fibres.

16. In apparatus for preparing fibrous stock for paper making, a rotor having a granular surface, said surface of the rotor being upwardly and outwardly inclined in the direction of its periphery and contoured to provide a plurality of generally radially extending ridges having sloping sides and forming valleys therebetween opening to the periphery of the rotor.

17. Apparatus for separating individual fibres from fibrous liquid borne stock for paper making which comprises a chamber having inner granular surfaces, a granular surfaced rotor forming the bottom of the chamber and having its periphery spaced from the chamber wall, the inner wall surfaces of the chamber being curved outwardly, upwardly and inwardly from the periphery of the rotor and spirally contoured to direct unreduced aggregate discharged from the periphery of the rotor back to the center of the latter, means to supply stock to the chamber and means to drive the rotor to cause the stock to circulate in a substantially continuous sheet form over the granular surfaces of the rotor and chamber walls, to comb individual fibres from the aggregate of the flowing stock, the granular surface of the rotor being contoured to direct isolated individual fibres into said space between the rotor periphery and the chamber wall.

18. Apparatus for preparing fibrous stock for paper making which comprises a casing, a shaft extending axially of the casing, a plurality of abrasively faced rotors secured to the shaft, an annular abrasively faced stator surrounding each rotor, means to rotate the shaft, means to supply stock to and centrally of the rotor adjacent one end of the shaft, the abrasive faces of the rotors being provided with outwardly directed contours opening to the periphery of the rotor and the abrasive face of each stator having upwardly and inwardly and downwardly and inwardly curved portions, said portions being provided with spirally directed contours to respectively return one portion of the stock received from the contours of the adjacent rotor back to the center of the latter and direct another portion of the stock to the succeeding rotor.

19. Apparatus for preparing fibrous stock for paper making which comprises a casing, a shaft positioned axially of the casing, a rotor fixed to the shaft, a face of the rotor being provided with a plurality of spaced, generally radially directed channels extending from the center portion of the rotor and opening to the periphery thereof, said face of the rotor including said channels having an overall granular abrasive surface, an annular stator carried by the casing and having its inner face spaced from the periphery of the rotor, means to supply stock to the central portion of the rotor, means to rotate said shaft to drive the stock by centrifugal action outwardly over and from the abrasive surface of the rotor, the inner face of the stator being formed with adjacent, annular concave granular abrasive surfaces positioned to respectively direct unrefined portions of the stock discharge from the surface of the rotor and the upper portions of the channels back to the center of the rotor and refined portions of the stock discharged from the lower portions of the channels to a point below the rotor.

20. Apparatus for preparing fibrous stock for paper making comprising a vessel having a stock receiving upper chamber, a lower chamber of less diameter than the upper chamber, said lower chamber forming an annular stator, a rotor positioned centrally of the annular stator and provided on its upper surface with a plurality of generally radially directed channels opening to the periphery thereof, means to rotate the rotor, said stator having upwardly and inwardly and downwardly curved faces provided with spirally directed channels to respectively direct one portion of the stock delivered from the rotor upwardly and inwardly above the rotor and another portion downwardly and inwardly below the rotor, the faces of said stator and rotor including said channels having overall granular, abrasive surfaces, and means to selectively return the portion of the stock discharged below the rotor to the upper chamber or discharge it from the vessel.

21. The method of preparing fibrous stock for paper making which comprises substantially saturating the stock with water to lower the resistance of the fibres to separation, circulating the so-conditioned stock to impart kinetic energy thereto, interposing an abrasive surface in the path of movement of the stock, said surface being contoured to present abrasive surfaces of varying height and angularity transverse to the path of movement of the stock to subject the stock to fibre separating combing under varying degrees of pressure and to stratify the stock according to the degree of fibre separation, and constantly removing from the circulating stock fibres of a predetermined degree of separation.

References Cited in the file of this patent

UNITED STATES PATENTS

| | | |
|---|---|---|
| 253,654 | Allen | Feb. 14, 1882 |
| 369,834 | Blackman | Sept. 13, 1887 |
| 1,556,927 | Fritz | Oct. 13, 1925 |
| 1,949,534 | Doyle | Mar. 6, 1934 |
| 1,986,660 | Allison | Jan. 1, 1935 |
| 2,008,892 | Asplund | July 23, 1935 |
| 2,033,123 | Cowles | Mar. 10, 1936 |
| 2,035,994 | Sutherland | Mar. 31, 1936 |
| 2,044,480 | Lord | June 16, 1936 |
| 2,129,789 | Seaborne | Sept. 13, 1938 |
| 2,265,936 | Cowles | Dec. 9, 1941 |
| 2,336,798 | Nash | Dec. 14, 1943 |
| 2,351,492 | Cowles | June 13, 1944 |
| 2,371,837 | Martindale | Mar. 20, 1945 |
| 2,424,679 | Cowles | July 29, 1947 |
| 2,426,923 | Cowles | Sept. 2, 1947 |
| 2,516,384 | Hill et al. | July 25, 1950 |
| 2,641,165 | Wandel | June 9, 1953 |
| 2,657,131 | Messing | Oct. 27, 1953 |
| 2,718,178 | Wandel | Sept. 20, 1955 |

FOREIGN PATENTS

| | | |
|---|---|---|
| 111,886 | Sweden | July 20, 1944 |